United States Patent [19]

Cote et al.

[11] Patent Number: 5,426,634
[45] Date of Patent: Jun. 20, 1995

[54] FLEXIBLE CALL-PROCESSING APPARATUS FOR ISDN TELEPHONE CHANNELS

[75] Inventors: Michael E. Cote; David J. Luneau, both of Concord; Paul R. Schechinger, Londonderry, all of N.H.

[73] Assignee: Summa Four, Inc., Manchester, N.H.

[21] Appl. No.: 830,003

[22] Filed: Jan. 31, 1992

[51] Int. Cl.⁶ ............................................. H04J 3/12
[52] U.S. Cl. .................... 370/58.2; 370/68.1; 370/94.1; 370/110.1
[58] Field of Search ............ 370/58.2, 68.1, 94.1, 370/110.1

[56] References Cited

U.S. PATENT DOCUMENTS

| | | | |
|---|---|---|---|
| 4,527,012 | 7/1985 | Caplan et al. | 179/18 |
| 4,736,364 | 4/1988 | Basso et al. | 370/68.1 |
| 4,970,721 | 11/1990 | Aczel et al. | 370/92 |
| 4,993,017 | 2/1991 | Bachinger et al. | 370/58.2 |
| 4,996,685 | 2/1991 | Farese et al. | 370/58.1 |
| 5,036,535 | 7/1991 | Gechter et al. | 379/210 |
| 5,051,992 | 9/1991 | Taniguchi et al. | 370/110.1 |
| 5,151,935 | 9/1992 | Slife et al. | 379/240 |

OTHER PUBLICATIONS

*SDS-1000 System Administrator's Guide*, pp. 2-23-2-46, 2-52-2-62.

Primary Examiner—Douglas W. Olms
Assistant Examiner—Russell Blum
Attorney, Agent, or Firm—Cesari and McKenna

[57] ABSTRACT

A call processor (10) for processing integrated-services digital-network (ISDN) calls is subject to real-time control by a host computer (28) but stores rules specified ahead of time by a manual input device (32). By changing the entered rules, a user can adapt the call processor to a wide variety of applications without burdening the host (28) with operational details in real time. In particular, the behavior specifications represent choices among the ISDN data-channel messages and contents that the call processor (10) will forward to the host computer (28) in reporting receipt of those messages. The behavior specifications also represent choices for transmitted ISDN data-channel messages and contents generated by the call processor (10) either autonomously or in conjunction with the host computer (28).

19 Claims, 38 Drawing Sheets

INPULSE RULES TABLE

| RULE #1 | RULE #2 | RULE #3 | RULE #4 | RULE #5 |
|---------|---------|---------|---------|---------|
| ISDN RX 1 | ISDN RX 2 | ISDN RX 3 | REP EACH | NO REP |
|  |  | ISDN TX 4 | ISDN RX 9 | REP NEXT |
|  |  |  |  | ISDN RX 9 |

FIG. 4

ISDN MESSAGE TEMPLATES

| TMPL 1 | MESSAGE SETUP | R/T R | TMPL 2 | MESSAGE SETUP | R/T R | TMPL 3 | MESSAGE SETUP | R/T R |
|---|---|---|---|---|---|---|---|---|
| REP ALL | | | REP | CHAN ID | | REP | CHAN ID | |
| | | | FLD 1 | CP NUM | | PROCESS | CHAN ID | |
| | | | REP | CD NUM | | D FLD 1 | CD NUM | |
| | | | | | | REP | CD NUM | |
| | | | | | | I FLD 2 | CP NUM | |
| | | | | | | FLD 3 | BEARER | |
| | | | | | | D FLD 4 | CP NUM | |

FIG. 5A

ISDN MESSAGE TEMPLATES

| TMPL | MESSAGE | R/T | TMPL | MESSAGE | R/T | TMPL | MESSAGE | R/T |
|---|---|---|---|---|---|---|---|---|
| 4 | CALL PROC | T | 5 | SETUP | T | 6 | ALERTING | R |
| IE | CHAN ID | | FLD 3 | | | | | |
| DATA | A98300 | | IE | CHAN ID | | | | |
| | | | DATA | A98300 | | | | |

FIG. 5B

ISDN MESSAGE TEMPLATES

| TMPL | MESSAGE | R/T | TMPL | MESSAGE | R/T | TMPL | MESSAGE | R/T |
|---|---|---|---|---|---|---|---|---|
| 7 | CONNECT | R | 8 | SETUP | T | 9 | SETUP | R |
| | | | IE | CHAN ID | | REP ALL | | |
| | | | DATA | A98300 | | PROCESS | CHAN ID | |
| | | | FLD 3 | | | | | |
| | | | IE | CP NUM | | | | |
| | | | DATA | A180 | | | | |
| | | | D FLD 4 | | | | | |

FIG. 5C

OUTPULSE RULES TABLE

| RULE #1 | RULE #2 | RULE #3 | RULE #4 | RULE #5 |
|---------|-----------|---------|---------|---------|
| ISDN TX 5 | ISDN RX 6 | | | |
| | ISDN RX 7 | | | |
| | ISDN TX 8 | | | |
| | ISDN SUP 1 | | | |

FIG. 8

ISDN SUPERVISION TEMPLATES

|            | 1      | 2 | 3 | 4 | 5 | 6 |
|------------|--------|---|---|---|---|---|
| TIME       |        |   |   |   |   |   |
| ALERTING   | REP    |   |   |   |   |   |
| CONNECT    | ANSREP |   |   |   |   |   |
| PROGRESS   |        |   |   |   |   |   |
| CALL PROC  |        |   |   |   |   |   |
| CONN ACK   |        |   |   |   |   |   |
| CONGEST    |        |   |   |   |   |   |
| FACILITY   |        |   |   |   |   |   |
| USER INFO  |        |   |   |   |   |   |
| REL CMPL   |        |   |   |   |   |   |
| FACIL ACK  |        |   |   |   |   |   |
| FACIL REJ  |        |   |   |   |   |   |
| REGISTER   |        |   |   |   |   |   |

FIG. 9

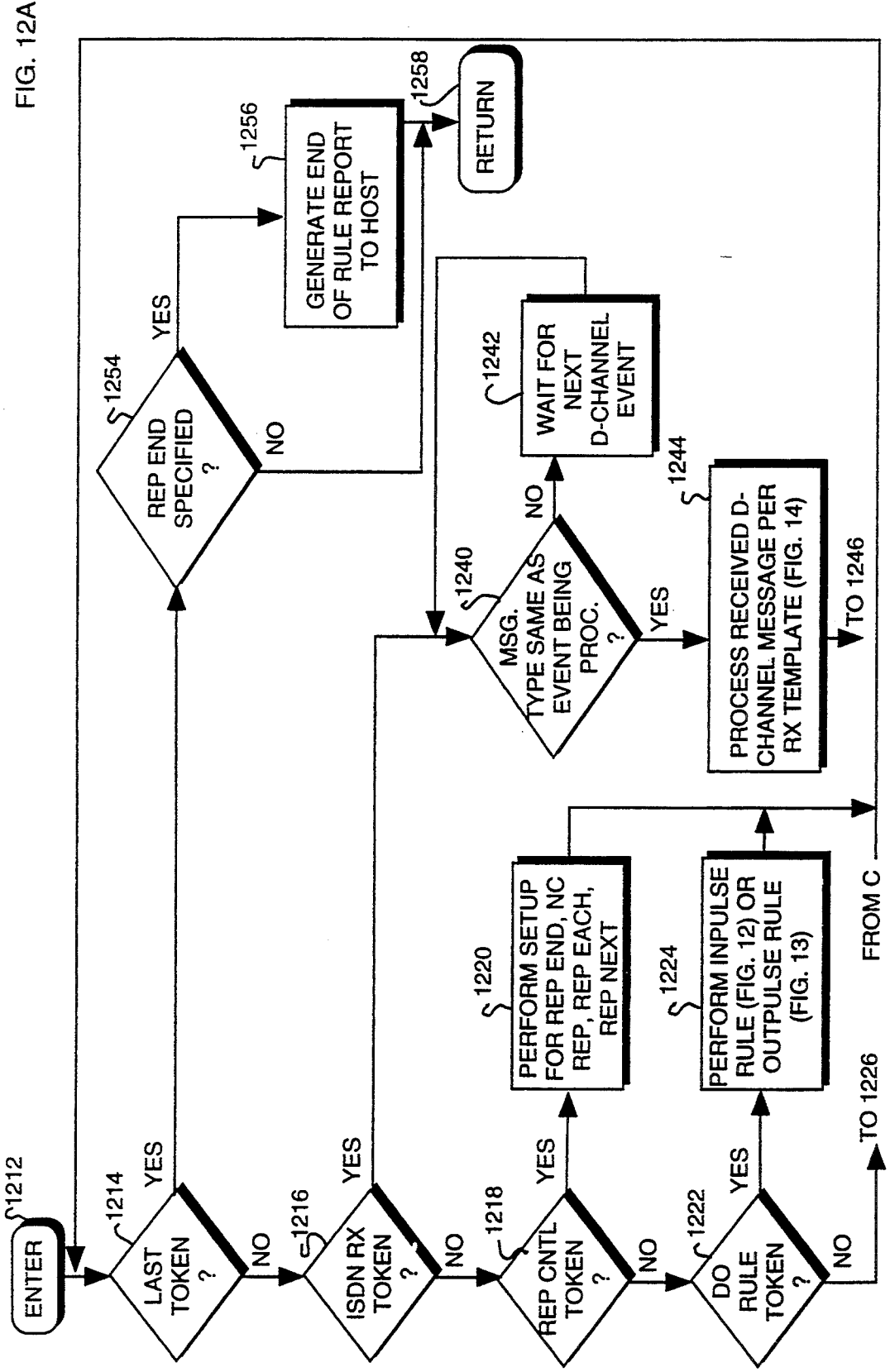

FLEXIBLE CALL-PROCESSING APPARATUS FOR ISDN TELEPHONE CHANNELS

BACKGROUND OF THE INVENTION

The present invention is directed to telephone-call-processing systems and in particular to systems for handling calls on time-division-multiplexed channels such as those implemented on Integrated Services Digital Networks ("ISDNs").

Many installations use computers to control telephone traffic into and out of those installations. In doing so, they operate call-processing apparatus, which responds to instructions from the computer by performing the lower-level operations required for call processing. Such apparatus also reports to the computer concerning the message traffic that it handles.

For instance, if the computer is to implement call forwarding, the call-processing circuitry would interpret the dial signals and report the numbers thus dialed to the computer. The computer would determine whether the call should be connected to the on-site equipment designated by that called number or forwarded to, say, off-site equipment associated with a different number. The computer would then direct the call-processing apparatus accordingly, causing it, say, to dial up the station to which the call is to be forwarded, detect the resultant ringback signals, and send ringback signals in turn to the originating station.

This, of course, is merely one example of the many types of functions that a call-processing equipment might perform, and it is often desirable that the same call-processing apparatus be adaptable to perform several such functions. For this reason, the call-processing equipment might be arranged to respond to considerable low-level control by the computer; i.e., the computer's programing could be used to provide the desired flexibility. This is impractical in many situations, however, because performance of many low-level tasks diverts the computer's resources from other functions, such as, say, record keeping and billing, that the computer may be required to do.

In the case of some call-processing equipment employed for conventional, "analog" channels, flexibility has been afforded without requiring extensive low-level operation by the host computer. Such equipment provides the call-processing system's operator with a keyboard or other manual input device by which he can enter behavior specifications into the call-processing apparatus. Alternatively, the behavior specifications can be entered by, e.g., computer. In any event, the specifications are stored for use in real time so that the host computer does not itself need to control the details of the processor's behavior in real time.

Specifically, a command that an operator might enter by way of the keyboard may be one that specifies whether the response to a call to be forwarded is immediate ringback, on the one hand, or, on the other hand, ringback only after the call-processing equipment itself receives a ringback signal from the forward-to station. Such equipment thus provides the desired flexibility without overly burdening its host computer.

A number of call-processing systems, however, are required to operate with ISDN networks, which do not then send normal supervisory (off-hook, ringback, etc.) signals that are the subjects of the analog-call-system keyboard commands of the types described above. Such networks convey a plurality of calls on a single two- or four-wire trunk line by time-division multiplexing. Since a given trunk line is not typically dedicated to a single call at any one time, conventional supervisory signals are inadequate to control the call traffic. The approach described above to achieve call-processing flexibility for analog networks thus is not effective for call processing on ISDNs.

SUMMARY OF THE INVENTION

The present invention provides call-processing equipment for ISDNs with the flexibility previously available only for analog-call processing. Like the analog-call-processing equipment described above, the call-processing equipment of the present invention employs an input device. However, it interprets certain entries from the input device as instructions for generating and responding to so-called data-channel messages.

Typically, digital communications facilities carry a number of time-division-multiplexed (TDM) channels. In ISDN communication, one of these channels known as the "data channel" contains information used to control the routing and/or processing of the other channels. These other channels, known as "bearer" channels, carry the actual digitally-encoded voice or data whose communication is the network's purpose. In accordance with the present invention, the instructions from the input device define the call processor's behavior in dealing with data-channel messages.

According to one aspect of the invention, for example, certain instructions from the manual input device are interpreted as directions to monitor the data channel for a message having an instruction-specified type indicator and to send to the host computer a message that contains instruction-specified "information elements" in the detected message. Other instructions from the input device are interpreted as directions for generating data-channel messages that make call requests and/or respond to received data-channel messages. By following such instructions, the call-processing system can respond in an autonomous fashion to received data-channel events without host-computer intervention or it can perform relatively complex series of tasks in response to only brief host-computer commands. In this way, operator entries can specify behavior by which the call processor interfaces to multiple networks, accommodates changes or differences in the ISDN protocol, and supports multiple applications. By providing these capabilities, the invention enables the operator to restrict the information with which the computer is burdened to only that which is necessary for the particular functions currently being implemented. When those functions are to change, then, the operator can change the call processor's behavior by entries from the keyboard or other manual input device.

BRIEF DESCRIPTION OF THE DRAWINGS

The above and further advantages of the invention may be better understood by referring to the following description in conjunction with the accompanying drawings, in which:

FIG. 4 depicts a typical input screen for defining inpulse rules for the call processor of the present invention;

FIGS. 5A–5C depict input screens for defining message templates to be called by the rules that the call processor of the present invention follows;

FIG. 8 depicts an entry screen for defining outpulse rules;

FIG. 9 depicts an entry screen for defining supervision templates;

FIGS. 12A, 12B and 12C depict a flow chart depicting the call processor's processing of an inpulse rule;

DETAILED DESCRIPTION OF ILLUSTRATIVE EMBODIMENTS

Figure 1:
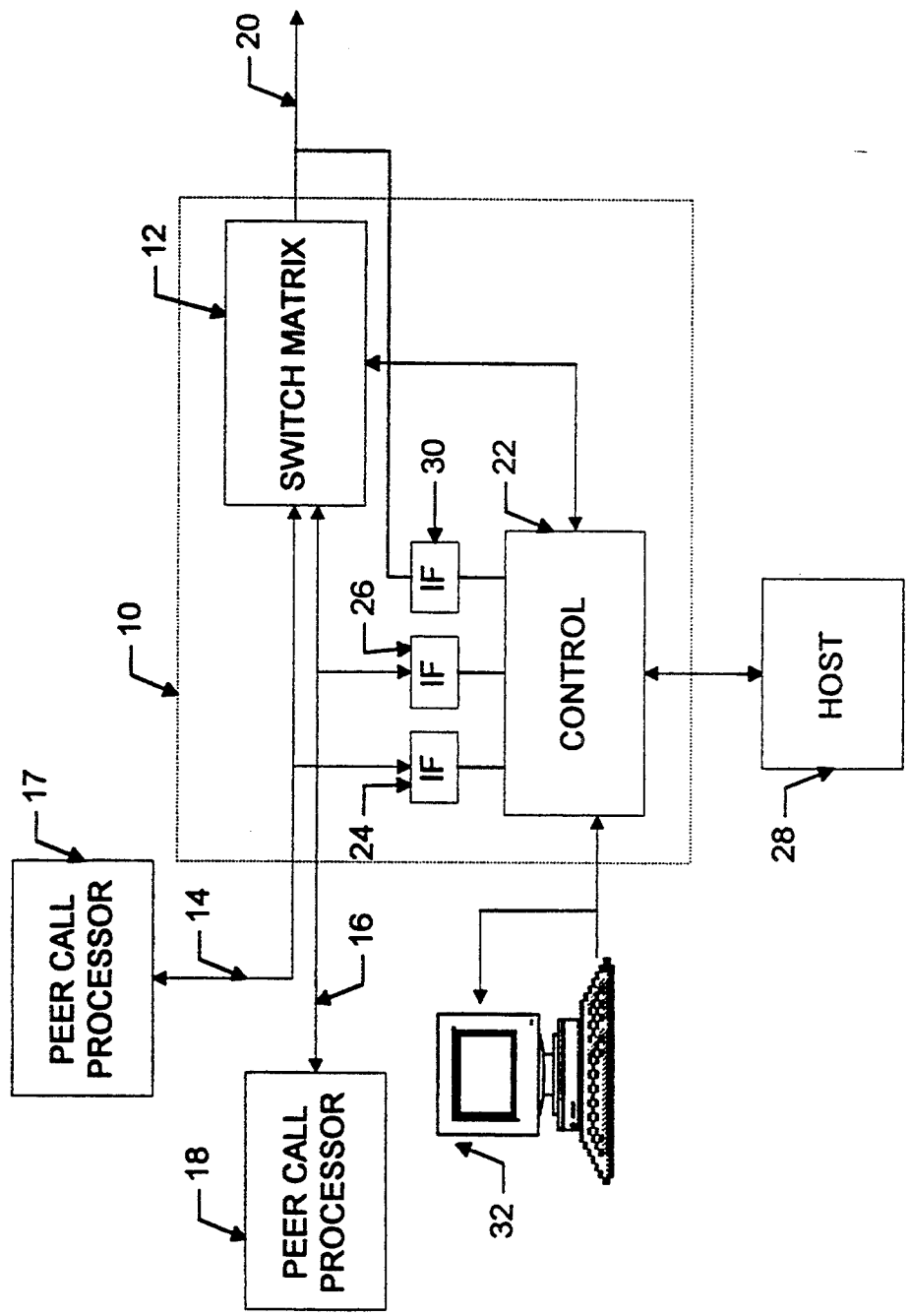
FIG. 1 is a block diagram of a call-processing system and a typical environment in which it might operate.

A call processor 10 that implements the teachings of the present invention typically (although not necessarily) includes a switching matrix 12 that receives lines 14 and 16 from peer call processors 17 and 18 at different locations and routes calls between those lines—or among, say, those lines and lines 20 of a local network—under the control of a control circuit 22. Control circuit 22 itself is coupled to the network lines 14 and 16 by means of interface circuits 24 and 26. The interface circuits 24 and 26 demodulate digital-channel signals that the network lines 14 and 16 carry and apply the resultant baseband digital information to the control circuit 22. They also modulate digital signals from the control circuit 22 and apply the resultant signals to lines 14 and 16. The purposes for which these capabilities are used will be described in more detail below.

In response to the signals that it observes on lines 14 and 16, and in response to instructions from a host computer 28, which provides higher-level control, the controller 22 performs various functions, such as changing the state of the switch matrix 12, transmitting signals over public-network lines 14 and 16 by means of interface circuits 24 and 26, and transmitting signals over the local network 20 by means of a further interface circuit 30.

The overall organization as described so far is conventional in call-processing circuitry for ISDN applications. According to the present invention, however, a manual input device such as a keyboard 32, or some other type of input device such as a computer, communicates with the controller 22 so as to affect the manner in which it generates and responds to ISDN data-channel messages. The manner in which such keyboard direction occurs will be described in more detail below after a brief description of a typical ISDN message format.

ISDN communication involves time-division multiplexing whereby a multiplicity of calls are handled by the same two- or four-wire line. Such a line can be thought of as providing twenty-four channels, one of which, the one containing control information, is known as the "data channel" or "D-channel," whereas the other twenty-three are referred to as "bearer channels" although they may contain data, too. The control information contained in the data channel pertains to the control and supervision of the twenty-three bearer channels. Optionally, the data channel may also carry control information for the twenty-four channels of other interfaces 16. A call (voice or data) utilizes one or several bearer channels.

Figure 2:
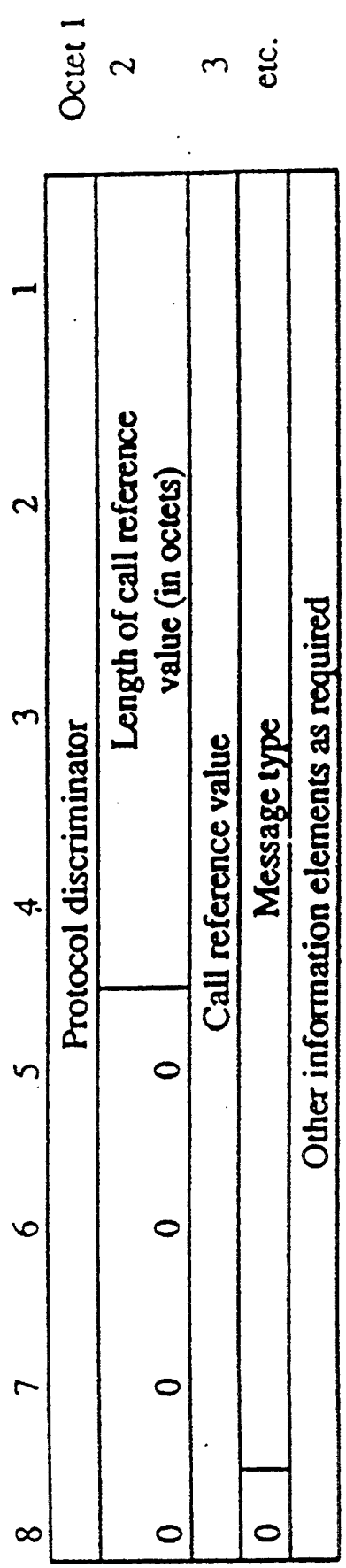
FIG. 2 is a diagram of the message format of a typical message of the type sent over an ISDN data channel.

FIG. 2 depicts a typical format of a data-channel message in eight-bit bytes. The first byte is a protocol discriminator: it specifies one of a number of protocols by which the remainder of the message is to be interpreted. According to the protocol that we assume for the purposes of this discussion, which is called the Q.931 call-control-message protocol, the first four bits of the second byte are all zeros, while the second four bits of that byte specify the length, in bytes, of a call-reference value. The next one or more bytes (as determined by the length value in the second byte) contains a reference value, i.e., the "name" that the apparatus at both ends of the line use to refer to the call that is the subject of the data-channel message. The byte after the call-reference value contains the message type, which we will discuss directly, and the remainder of the message contains "information elements" consistent with the message type.

Figure 3:
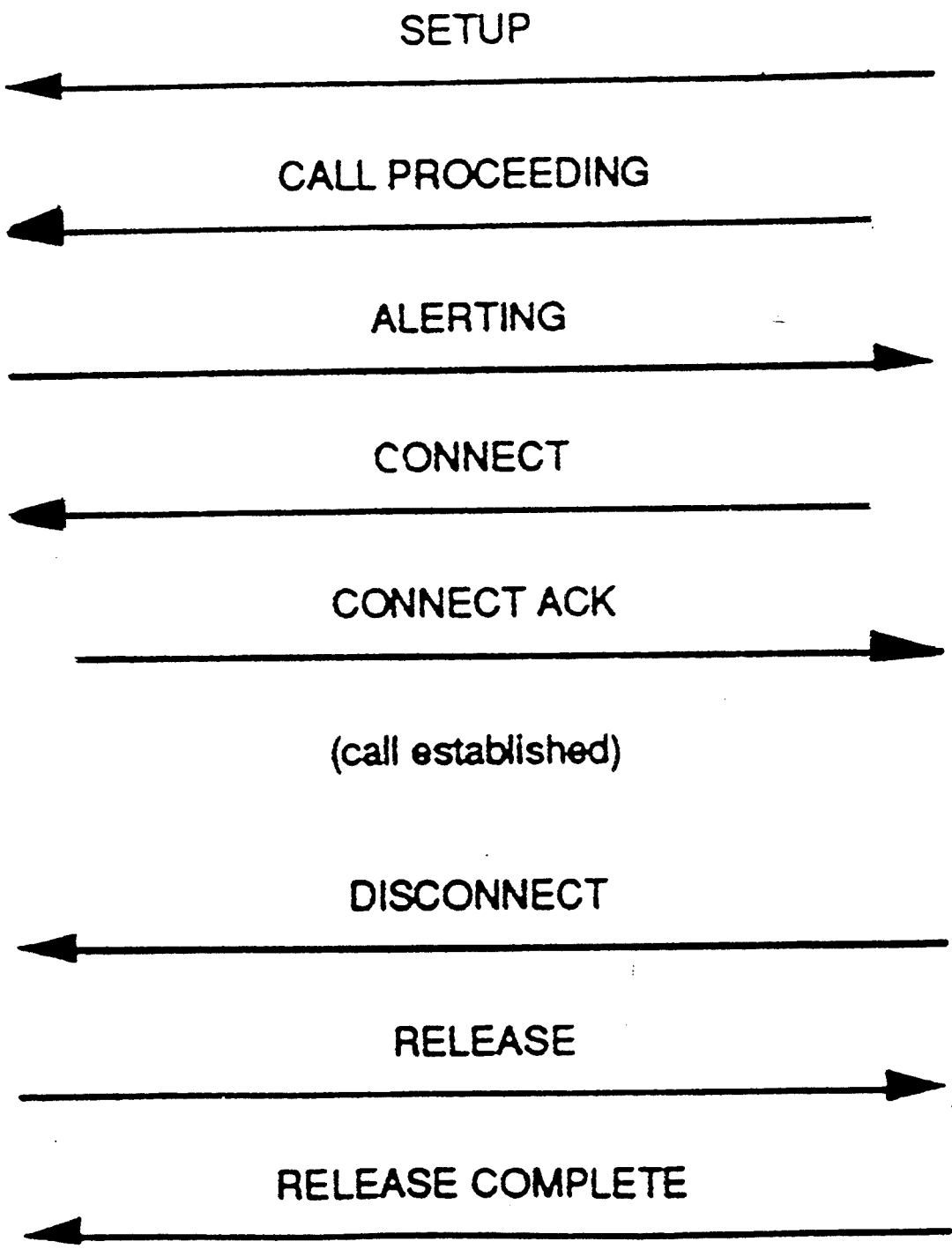
FIG. 3 is a diagram of a typical call sequence.

According to this ISDN protocol, the message types for a typical call proceed in a manner that FIG. 3 depicts. Call-processing equipment on the left end of the network line transmits by way of the data channel (i.e., by way of the control-dedicated time slots in successive ISDN transmission periods) a SETUP message, i.e., a message in which the "message type" field (FIG. 2) identifies the message as being a SETUP message. Such a message means that someone at the left end wants to place a call, and the equipment is requesting that some currently idle bearer channel be allocated to that call. If the apparatus at the right end of the line receives the message completely, it responds by sending, again over the data channel, a CALL PROCEEDING message, which indicates completeness of that reception.

The SETUP message will have included the telephone number of the party to whom the call is directed, and the apparatus at the right end of the line typically will respond further by sending an ALERTING message if the station to which the call is directed is not busy. In response to the ALERTING message, the apparatus at the left end of the line may, for instance, apply a ringback signal to the station apparatus (e.g., telephone set) at its end that originated the call.

If the station equipment to which the apparatus at the right end of the line is directing the call goes off hook, that apparatus will report this event to the apparatus at the left side of the line by transmitting a CONNECT message, to which that apparatus will respond by transmitting an CONNECT ACK message, and the call-processing apparatus at the opposite end of the line will then perform switching in such a manner that the signal from the originating station is transmitted by means of the designated bearer channel to the station equipment to which the apparatus at the right end of the line directs it.

When the station apparatus at, say, the right-end goes on hook at the end of the call, the right-end call-processing equipment notifies the left-end equipment by sending a DISCONNECT message, to which the left-end equipment responds by sending a RELEASE message. From this message the right-side equipment concludes that the bearer channel is now idle, and it sends a RELEASE COMPLETE message from which the left-side equipment concludes the same thing.

In accordance with the example ISDN protocol, there are other types of data-channel messages, of course, all of which have various functions necessary for call completion or system maintenance and diagnosis, but the foregoing typical interchange shows sample meanings of various types of messages that might be transmitted by way of the data channel. Other ISDN standards, such as the CCITT standard employed for European ISDN traffic, employ different message sequences. But the principle is the same: the operator can specify in advance the way in which the call-processing system will respond when one or more of these messages (or, as will be seen, other inputs) arrive.

Part of the way in which the user specifies the call-processor behavior is to define "inpulse rules." A rule is a set of procedures that the call-processor follows in response to reception of incoming data-channel messages, directions from the host processor, or invocation by other rules, as will be explained directly. The specific way in which the operator (or, say, a computer) specifies these rules is not critical to the invention, but one advantageous way will be described in connection with FIG. 4.

FIG. 4 depicts a display screen that the call processor presents to the operator in response to an indication from the keyboard that a rule will be defined. The display includes the legend "Inpulse Rules Table" as well as rule numbers and spaces to indicate the locations in which behavior-specifying "tokens" should be entered. It also displays tokens previously entered for various ones of the rules.

An example is rule no. 1, whose first token is "ISDN RX 1." In the illustrated embodiment, this represents reference to a "template," which is a series of tokens that may be called by more than one rule. In the illustrated embodiment, the call-processing device can be used with analog lines as well as with ISDN lines, so the "ISDN" part of the template identifier specifies that it is one of the class of templates that are used for ISDN processing. A subset of the message templates are those used to respond to incoming messages, and it is this subset that the "RX" part of the template identifier refers. Finally, the "1" refers to the specific template.

FIG. 5 depicts a display that presents nine message templates that the operator has entered. Template no. 1 (the one with the "1" entry in the "Tmpl" field) is the one that rule no. 1 specifies. The SETUP entry in that template's "Message" field and the "R" in the "R/T" field indicate that the template defines a response to a SETUP message received from the network. The only token listed in that template is "REP ALL," which means that, at the end of rule execution, the call processor is to report a reception of any incoming SETUP message to the computer by means of a report that includes all of the information elements contained in the SETUP message. One call-processing example will make this clearer.

The example begins with the reception of a SETUP message over the data channel of line 14. As was stated above, one of the ways in which the host computer controls the call processor is to invoke rules previously entered by the operator. Specifically, the host computer instructs the call processor that, for a given call in progress, a particular rule will prevail. Additionally, however, the operator will have designated one of the rules as the "default" rule, which is the rule that prevails when the call processor receives an initial, SETUP message, i.e., when the host computer is not yet aware that a call is being initiated. For the example, we will assume that the operator has designated rule no. 3 as the default rule.

Figure 6:
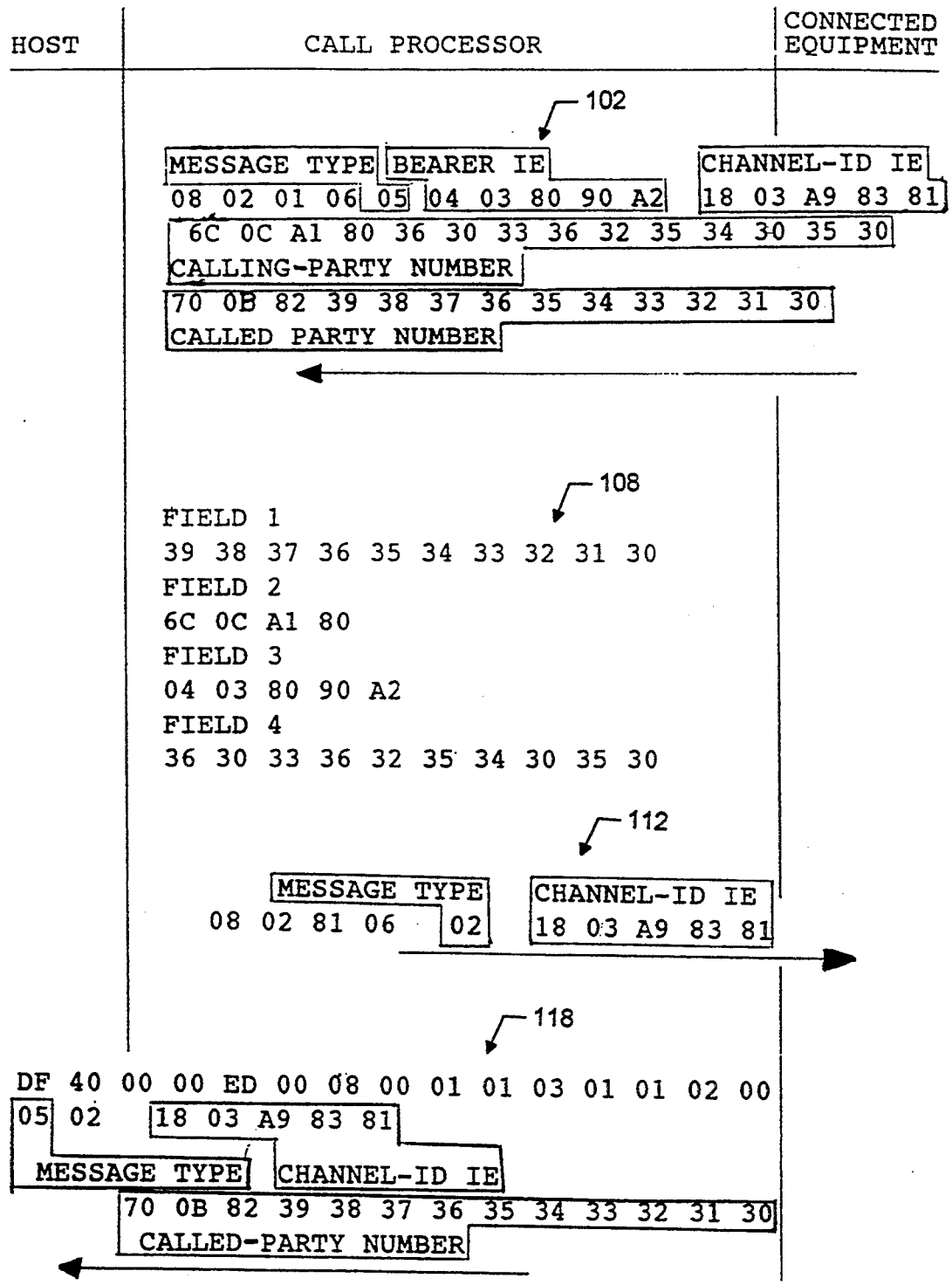
FIG. 6 is a diagram depicting an initial interchange among the call processor, its host computer, and a trunk line to which it is connected in response to a setup message from that trunk line.

FIG. 6 depicts the message and report traffic that results. FIG. 6 lists, by hexadecimally represented bytes, a typical setup message 102. In accordance with the format described above, the message begins with a protocol discriminator whose value is "08," a length-indicating byte whose value, "02," indicates that the call-reference value, will be given in two bytes, a two-byte call reference whose value is "01 06," and a message-type byte whose value, "05," identifies the message as a SETUP message.

Further information in the message takes the form of "information elements." Specifically, the sixth byte is interpreted as the first byte of an information element. This byte, whose value is "04," identifies the information element as a multi-byte bearer-type information element. The value, "03," of the next byte indicates that the information element contains three more bytes. Since the information element is of the bearer type, therefore, the next three bytes contain information concerning various characteristics that are to be had by whatever bearer channel carries the call.

The value, "18," of the byte with which the next information element begins identifies it as a multi-byte channel-ID information element, i.e., one that designates the bearer channel on which the originating equipment requests that the call take place. The value, "03," of the next byte indicates that there are three more bytes in the information element, which, since the information element is of the channel-ID type, specifies the requested channel.

In a similar manner, the next fourteen bytes are interpreted as a third information element, which contains the calling-party number, and the remaining bytes are interpreted as a fourth information element, which contains the called-party number.

The host computer is not yet aware that a call is being initiated, and it therefore has not as yet specified any rule for the call. The rule initially prevailing is thus the default rule, assumed for the sake of the example to be inpulse rule no. 3 (FIG. 4), whose first entry, "ISDN RX 3," calls for processing of receive template no. 3.

As FIG. 5 shows, the message specified by template no. 3 is a received SETUP message. As was indicated above, the default rule specifies the behavior of the call processor in response to a message not yet associated with a call. By specifying that template no. 3 should be processed first, the default rule indicates that, out of all such messages, the call processor should respond only to a SETUP message. Since the message that it has just received in accordance with the example is a SETUP message, the call processor executes the steps specified by the tokens in that template.

"REP CHAN ID," the first token in message template no 3, indicates that the channel-ID information element in the received SETUP message should be included in a report to be sent to the host computer at the end of rule execution. The next token, "PROCESS CHAN ID," directs the call processor to insure that the bearer channel specified by the channel ID in the incoming SETUP message is one to which the call processor is willing to dedicate to the call. (The equipment at the other end of the line "knows" whether the requested bearer channel currently is idle, and it thus does not request an occupied channel. However, the equipment at this end may, for instance, be reserving that channel for some specific purpose and may thus decline to use the requested channel. According to the ISDN protocol, therefore, some negotiation may occur. For the purpose of this discussion, however, we will assume that no such complication arises.)

"D FLD 1 CD NUM," the third token, directs that the called-party number in the received SETUP message be stored in the memory in field 1 of a set of registers allocated to the call being initiated by that message. More specifically, the "D" with which the token begins specifies that only the data part of the called-party-number information element, i.e., only the actual digit information, is to be stored in field no. 1. In the called-party-number format, the first three bytes are taken up with the information-element identifier, the information-element-length indicator, and what are known as the number "type" and the numbering-plan identification. These three bytes are referred to as the "intermediate" information, while the remainder of the information element is considered the data. The third token specifies that only the data part be placed in field no. 1 for this call.

"REP CD NUM," the fourth token, like the first token, specifies contents to be included in the end-of-rule report to the host computer. Specifically, it calls for inclusion of the entire called-party-number information element in that report.

The fifth token directs that only the intermediate information, i.e., the first three bytes, of the calling-party number be stored in field no. 2 associated with the call being initiated, while the sixth token directs that the entire bearer-ID information element be stored in field no. 3 for that call.

The final token in message template no. 3 stores the data part of the calling-party number in the initiated call's field no. 4. FIG. 6 depicts the resulting contents 108 of these fields.

The template invoked by inpulse rule no. 3's first token has now been processed, so the call processor turns to the second token, which invokes transmit template no. 4. As FIG. 5 shows, this template directs the call processor to transmit a CALL PROCEEDING message over the data channel from which it received the message that caused the previous, receive-message template to be processed.

Message template no. 4 includes only two tokens. The first, "IE CHAN ID," indicates that the CALL PROCEEDING message to be sent should include a channel-ID information element. The other token, "DATA A98300," literally specifies the data to be included in that information element. More precisely, it literally specifies only the first three bytes of that information element; in accordance with the convention that the illustrated embodiment implements, the "00" value of the last byte indicates that the last byte should contain the channel ID. (The illustrated embodiment provides many options for identifying the bearer channels involved in various messages. In some cases, for instance, many channels may need to be identified simultaneously. The initial-data-section contents that the second token specifies indicate that only a single bearer channel is to be specified by the last byte of the channel-ID information element.)

The call processor accordingly then sends a CALL PROCEEDING message 112, as FIG. 6 shows. It automatically constructs the first four bytes from the protocol-specifier, call-reference-length, and call-reference information, and it gives a value of "02" to the fifth byte to indicate that the message is a CALL PROCEEDING message. The message includes a channel-ID information element whose first two bytes are those of the second token in the transmit-message template. The remaining byte contains the actual channel ID from the SETUP message.

In addition to the steps explicitly defined by the rule tokens, invocation of an inpulse rule implicitly calls for transmission of an inpulse-complete report to the host computer when the other steps have been completed, unless an explicit entry in the rule specifies otherwise. Accordingly, as FIG. 6 indicates, the call processor transmits to the host computer a report 118 that contains information that the template specified.

Message 118 is shown as beginning with fifteen bytes, whose purposes will not be explained here in detail. The first four bytes contain housekeeping information related to communication between the host and the call processor. The specific meaning of these four bytes is not relevant to the present invention and so will not be discussed here. The rest of the first fifteen bytes include a fair amount of routine information not explicitly requested by the rule. Such information, for instance, would typically specify the number of the inpulse rule whose completion is being reported as well as various information concerning whether rule processing completed normally or was, say, aborted due to an error condition.

Following the first fifteen bytes, the illustrated message has a byte whose value is "05" and represents the type of message, SETUP, in response to which the inpulse rule was performed. Following that byte is one whose value is "02" to indicate that two information elements follow that byte. The first of these information elements comprises the next five bytes and contains the channel-ID information element. The first byte of that information element, whose value is "18," indicates that the information element is of the channel-ID type, while the second byte, whose value is "03," indicates that the information element contains three more bytes. Those three bytes contain the channel-ID information element received in the SETUP message. Inclusion of this information element in the report is the result of the first token, "REP CHAN ID," in receive-message template no. 3 of FIG. 5. The remaining bytes in the report make up an information element included in response to the fourth token in receive-message template no. 3. That information element contains the called-party number that the received SETUP message contained.

The host computer has now been notified that call initiation has been attempted. According to the invention, moreover, an operator has selected for inclusion in the report only the information that the host needs to perform the application that it is to run.

At this point, the host computer is given an opportunity to respond to reception of a SETUP message. Specifically, the call processor begins a six-second timer, and the usual result is that, within the six seconds, the host computer gives the call processor instructions. If the computer gives no instructions concerning that call within six seconds, then the call processor appropriately releases the call by using the data channel and thereby terminates the call attempt.

Figure 7A:
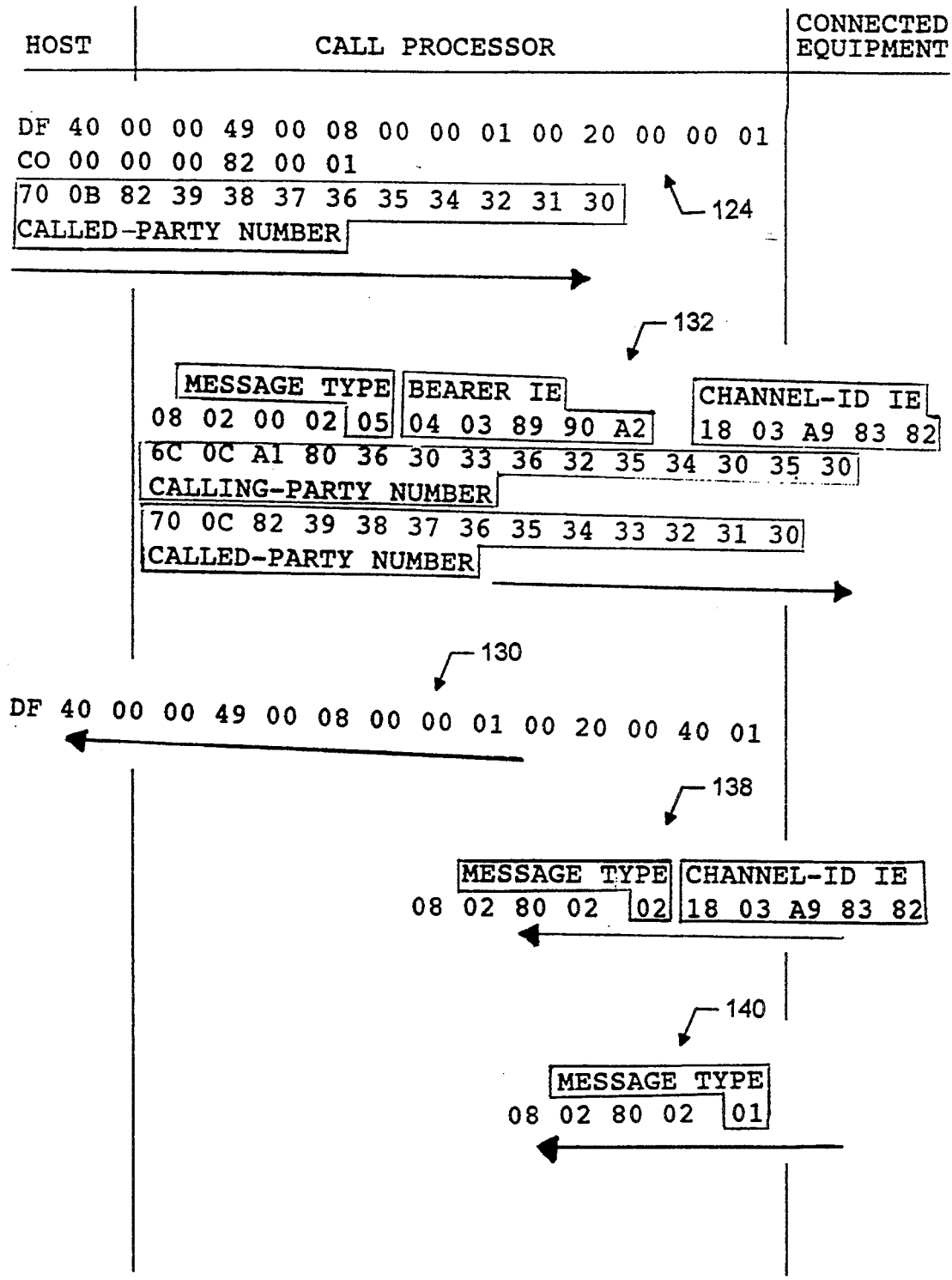
FIGS. 7A–7B, together constitute a diagram similar to FIG. 6 depicting the interchange that results from the host's computer response to the message that it receives in FIG. 6.
Figure 7B:
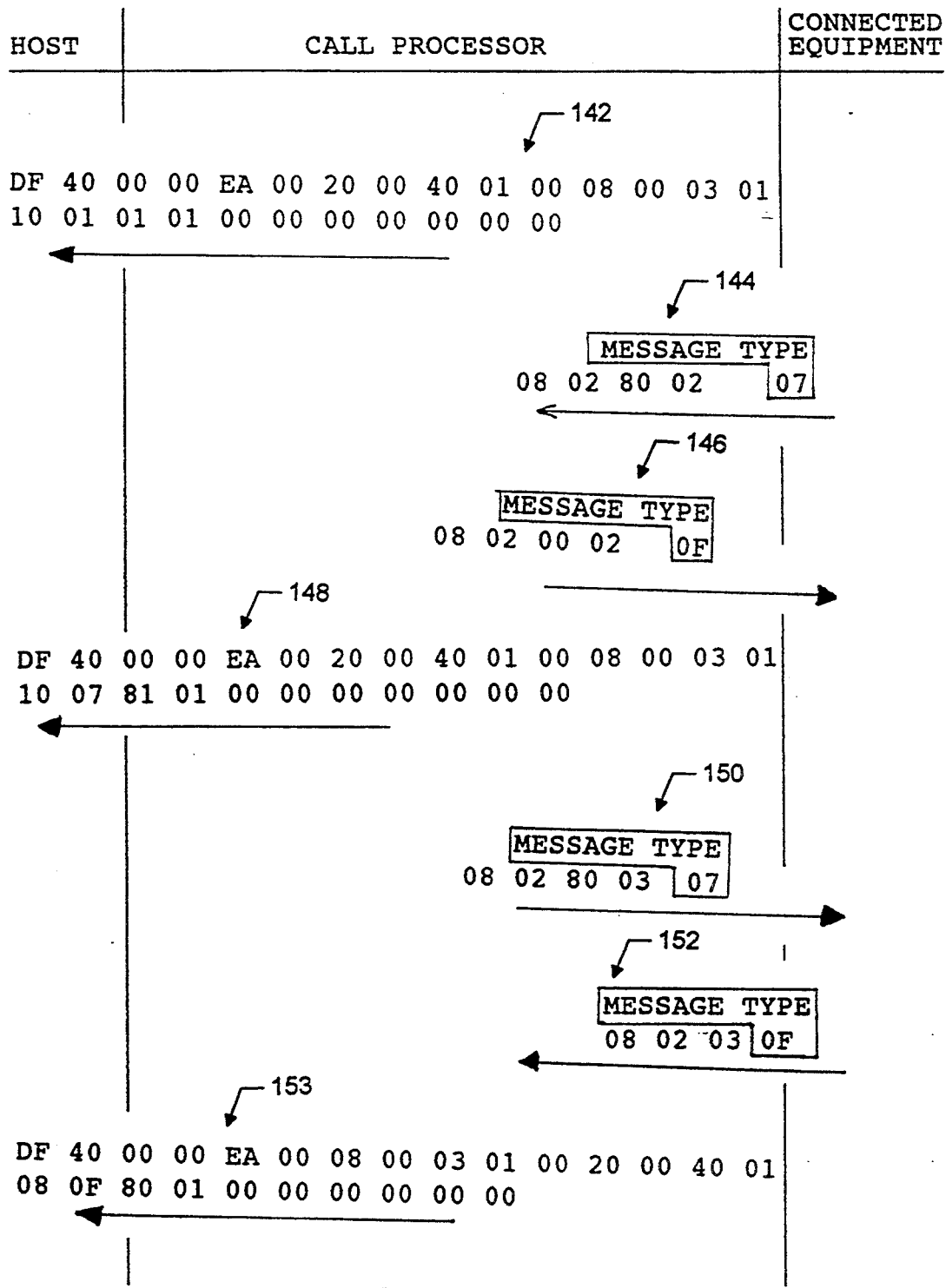

In the example, however, we will assume that the host computer does in fact issue a command. FIG. 7 depicts the resultant exchange. Having been notified of the receipt of a SETUP message and of the telephone number of the station to which the call to be initiated by the SETUP message was directed, the host processor has determined that, in order to make the necessary connection, it will need to connect the bearer channel in which the initial SETUP message was received with another bearer channel, this one on line 16, by which it communicates with call-processing equipment 18 at a third location. The host accordingly sends a command 124 to the call processor.

As in report 118, the first four bytes in command 124 are message-status data. The fifth byte, whose value is "49," specifies that the command is one for channel control, as opposed to, say, one directed to various diagnostic and maintenance functions. We assume that the channel suggested in the SETUP message and accepted by the call processor is the channel over which the incoming, line-14 leg of the call is to occur, and the sixth and seventh bytes, whose value is "00 08," identifies this channel by its internal, "port," number. The eleventh and twelfth bytes identify, by its internal, port number "00 20," the channel on which the outgoing, line-16 leg of the call is to occur. At this point, the call processor associates the incoming and outgoing calls so that it can pass information elements between them.

The next byte of interest is the twentieth, whose value, "82," designates, in accordance with a code system employed in the illustrated embodiment, invocation of outpulse rule no. 2. The twenty-second byte, whose value is "01," indicates that the command itself includes one information element for inclusion in the message to be sent. That information element, which takes up the rest of the command, begins with a byte whose value is "70" and thus identifies the information element as one containing a called-party number, while the second byte of that information element, whose value is "0B," indicates that the information element contains eleven ($0B_{16} = 11_{10}$) further bytes, which represent the called-party number together with various information about the number in accordance with the conventional ISDN protocol.

In response to this command, the call processor converts to outpulse rule no. 2 for the indicated call. FIG. 8 depicts the outpulse rules that the operator has entered and shows that outpulse rule no. 2 contains four tokens. The first two tokens designate receive-message templates, which, as FIG. 5 shows, specify ALERTING and CONNECT messages. This means that the call processor should monitor that channel for the ALERTING and CONNECT messages and process the respective template when it receives one of those messages. However, the call processor does not wait for reception of those messages before it proceeds to the third outpulse-rule token, "ISDN TX 8." This token invokes a template that, as FIG. 5 indicates, specifies transmission of a SETUP message.

The first token in template no. 8, "IE CHAN ID," indicates that the SETUP message should include an information element whose first byte identifies it as being a channel-ID type of information element. The second token, "DATA A98300," specifies the first two bytes that the information-element data part in the manner previously described. The call processor will automatically complete that data information element with the ID of the channel specified by the host command for the outgoing ("associated") call.

The next token, "FLD 3," states that the SETUP message to be sent is to include the contents of field no. 3 associated with the "controlling channel" specified in the command that invoked the rule. This is the bearer information element received in the SETUP message by which the call began. It specifies the characteristics that the bearer channel is to have, such as its data rate.

The fourth through sixth tokens indicate that the new SETUP message is to contain a calling-party-number information element in which the data segment is made up of the literally specified bytes "A1 80" as well as the contents of field no. 4, which received the calling-party number in response to the inpulse rule that was processed upon the reception of the incoming SETUP message.

In response to this template, the call processor initiates the outgoing leg of the call by transmitting SETUP message 132 over the data channel on line 16. The first five bytes of that message describe the message format and type in the manner described above, and the sixth through tenth bytes contain the field-3 contents, i.e., the bearer information element. The eleventh through fifteenth bytes contain the channel-ID information element, also in accordance with transmit template no. 8. The sixteenth through twenty-eighth bytes contain the calling-party number as specified in transmit template no. 8. In addition to the template-specified information, moreover, the message includes a host-specified IE, which was from the host command 124 that invoked the outpulse rule. This information element consists of the remaining bytes and contains a called-party number.

The call processor assigns a call ID for every such call attempt, and it reports the value of this ID to the host by means of a report 130, which identifies the "controlling" and "associated" bearer channels in a manner the same as that in which command 124 does. In the thirteenth and fourteenth bytes, moreover, it gives the call ID that the call processor has assigned.

A CALL PROCEEDING message 138 then appears on the outgoing data channel, as FIG. 7 indicates. The third and fourth bytes, "80 02," of the message differs from those of message 132, which identified the outgoing leg of the example call, only in the first bit, which is a one rather than a zero. The first bit in the call reference indicates which end initiated the call, the "call" in this context being one leg of a multiple-leg call. In the case of message 132, the first bit of the call reference is clear because call processor 10, which sent message 132, initiated the call. Message 138, on the other hand, has that bit set; it was sent by peer call processor 18, which did not initite the call. Since the other bits of message 138's second and third bytes are the same as those of message 132, however, they indicate that message 138 refers to the call that message 132 initiated. It is therefore subject to the same rule, namely, outpulse rule no. 2.

The response of the call processor to receipt of this message, as well as to the following, ALERTING message, is specified by the final token, "ISDN SUP 1," in outpulse rule no. 2 of FIG. 8. That token invokes a third type of template, namely, a supervision template, for which FIG. 9 depicts the entry screen.

As FIG. 9 shows, entry of a supervision template differs from that of message templates in that the call processor provides a line for each of a number of the types of messages to which the call processor might be required to respond. Of course, other embodiments of the invention may employ a different format and/or a different selection of messages or other events. For supervision template no. 1, which is the one that the outpulse rule in the example specifies, entries have been made for only two type of messages, namely, the ALERTING and CONNECT messages. Since there is no entry for a CALL PROCEEDING message, the call processor generates no report in response.

The REP token in the ALERTING row, however, indicates that the call processor should report reception of ALERTING message 140 to the host computer upon receipt. The call processor sends a report 142 to the host. For the sake of example, the rule includes a token for an ALERTING template. If that template included any tokens, it would specify the report that is sent at this point. In the example, though, it has no token contents, so the report is the same a it would have been if the rule had included no such template token. The fifth byte of report 142 indicates that this report is of a type intended particularly for such events. The sixth through fifteenth bytes, in accordance with the format that the fifth byte specifies, specify the bearer channels involved and the call IDs of the calls that they are supporting. The fifteenth and sixteenth bytes indicate that the report is one specified by a supervision template and that it was generated in response to receipt of an ALERTING message. The next several bytes, up to the twenty-fifth, give various information concerning whether the outgoing port is considered to be answered, what the supervision template was that caused the report, whether one or a number of various types of errors occurred, and the number of the outpulse rule that was processed. The twenty-fifth byte, whose contents are "00," indicates that no further information elements follow.

The next event in the example is receipt over the outgoing data channel of a message 144, which is a CONNECT message. The call processor has an automatic response to connect messages: it sends the CONNECT ACK message 146. It also reports the receipt of the connect message to the host processor in accordance with the supervision template. The "ANS REP" token in the supervision template's CONNECT row indicates not only that the report should be issued but also that the call processor should send a CONNECT message over the incoming data channel and await the resultant CONNECT ACK message. As a result, the call processor transmits CONNECT message 150 over that data channel, which responds with a CONNECT ACK message 152.

The "ANS REP" token also indicates that the supervision template has been satisfied and that outpulse-rule processing should continue. Since the supervision processing was the last token in the outpulse rule, however, outpulse-rule processing now terminates.

The receipt of the CONNECT ACK message 152 causes the call processor to generate report 153 and send it to the host. The sixteenth and seventeenth bytes of report 153 indicate that the call borne by the involved bearer channels (which are identified by their port numbers in the report's sixth, seventh, eleventh, and twelfth bytes) has been answered. The sixteenth byte indicates that no rule processing was currently active for the call. The seventeenth byte indicates that a CONNECT ACK signal has been received.

With this, the call processor's operations to establish a stable call have been completed.

Figure 10A:
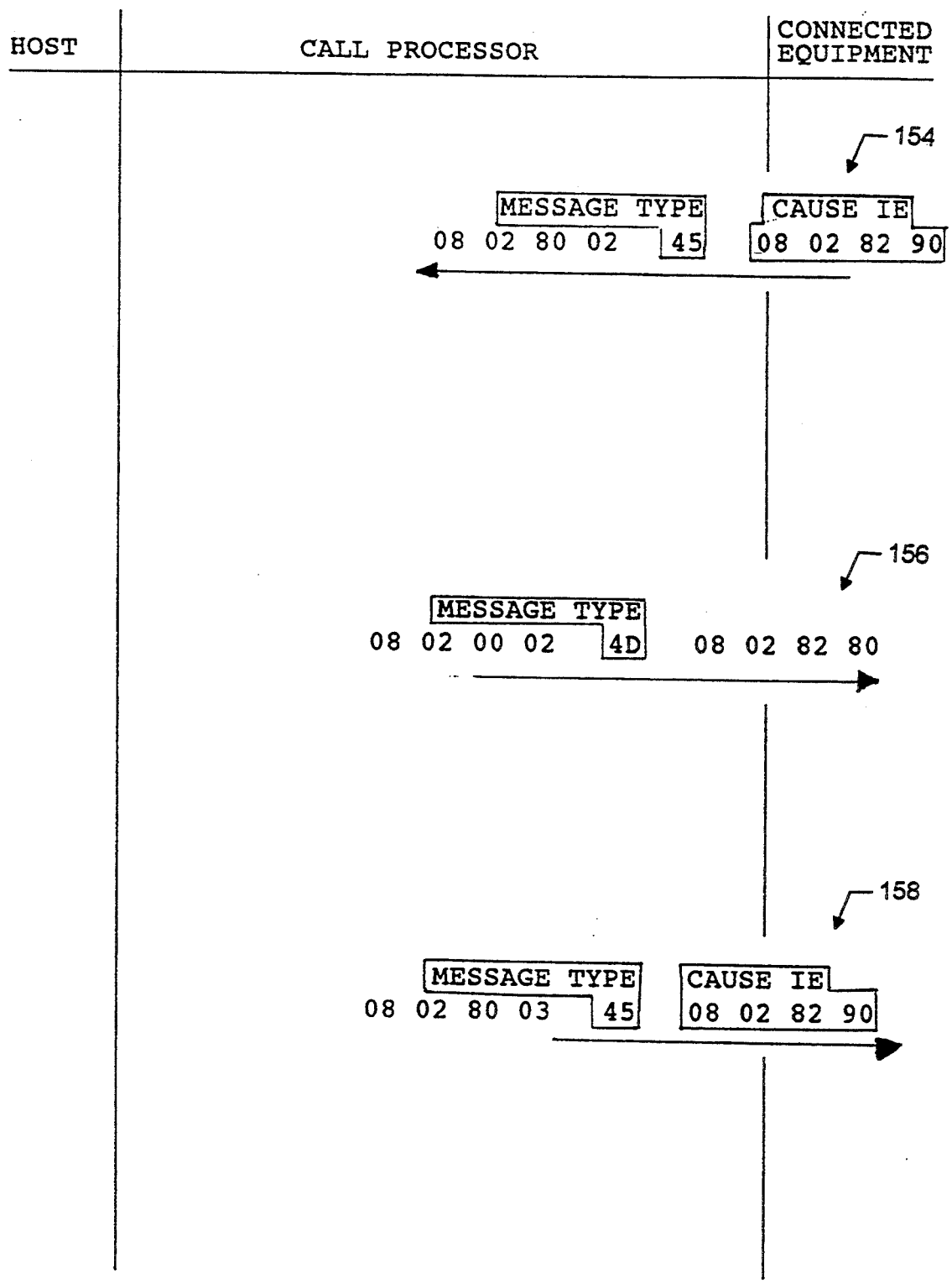
FIGS. 10A and 10B depict the interchange among the call processor, its host computer, and the trunk line in response to a DISCONNECT message from the trunk line.
Figure 10B:
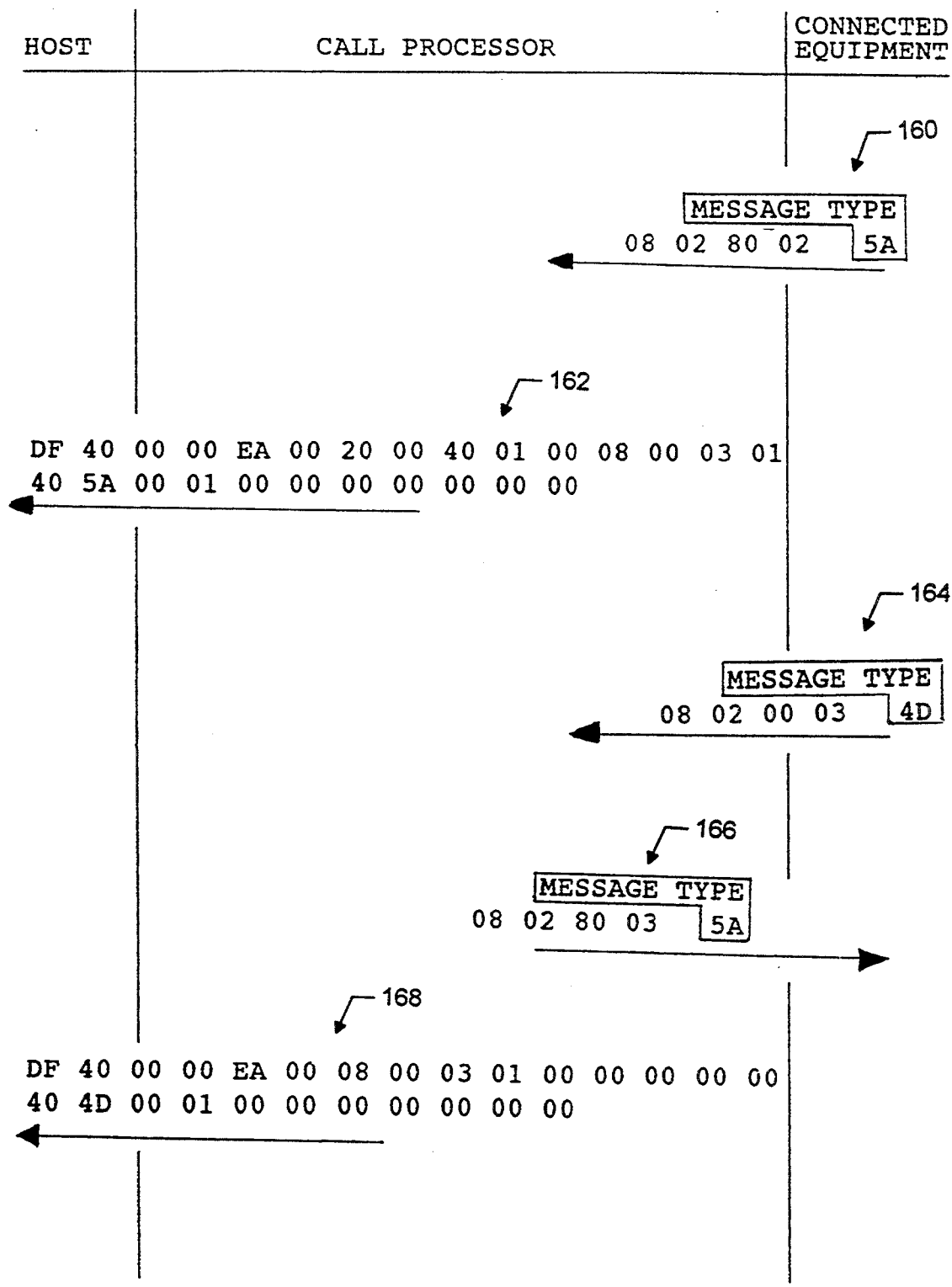

The outpulse rule used to establish the call could also have been used to specify the call processor's responses to further data-channel messages associated with that call. However, as is already apparent in light of some of the other automatic operations that have occurred, the illustrated embodiment does not require that rules be used to specify all of the call processor's behavior. This will be illustrated in connection with FIG. 10, which depicts the exchange that occurs at the end of the same call. In FIG. 10, the call processor receives a message 154 from the outbound data channel. This is a DISCONNECT message, as its fifth byte, having a value of "45," indicates. Its second and third bytes refer to the outgoing leg of the call that was begun in the exchanges of FIG. 7, and its sixth through ninth bytes constitute an information element. The sixth byte identifies the information element as being of the "cause" variety, the seventh indicates that it includes two more bytes, the eighth specifies the coding standard of the ninth byte and identifies the network location where the cause was generated, and the ninth indicates that the cause of the disconnection is normal call clearing: the other party hung up.

Without directions from an operator-entered rule, the call processor automatically responds, in accordance with the ISDN protocol, by transmitting a RELEASE message 156 having the same cause information element. The call processor consults information that it has stored about the call that the call reference in that DISCONNECT message 154 specifies, and it sees that it is associated with an incoming call. The call processor accordingly transmits a DISCONNECT message 158 over the data channel for the incoming leg of the call. Meanwhile, the peer call processor 18 at the end of the outgoing leg of the call has received the RELEASE message 156 and completes the ISDN handshake with a RELEASE COMPLETE message 160, as FIG. 10B indicates.

The call processor can respond to a RELEASE COMPLETE message by sending a report to the host processor to indicate that the bearer channel concerning which the RELEASE COMPLETE message was received is now in an idle state and available for another call. This is the purpose of the change-of-state report 162. The sixteenth byte of report 162 indicates that the change being reported is that a channel has become inactive, and the seventh byte identifies that channel as the outgoing channel of the subject call. The host is thus notified that this channel is now inactive.

The incoming channel then brings a RELEASE message 164, to which the call processor automatically responds with a RELEASE COMPLETE message 166 and then sends the host computer a change-of-state report 168 to indicate that the bearer channel that previously supported the incoming leg of the subject call is now idle and can be used again. This completes the call processor's action on the exemplary call.

The foregoing example illustrates certain of the tokens that an operator might use to specify the behavior of the call processor. The remainder of the specification gives a more-complete description of a typical token set that one might use to implement the teachings of the present invention. These tokens will be described by means of flow charts that illustrate inpulse-rule-processing, outpulse-rule-processing and call-clearing operations. Before considering the flow charts themselves, however, a brief digression to a consideration of what is referred to as a call's "state" is helpful.

Figure 11:
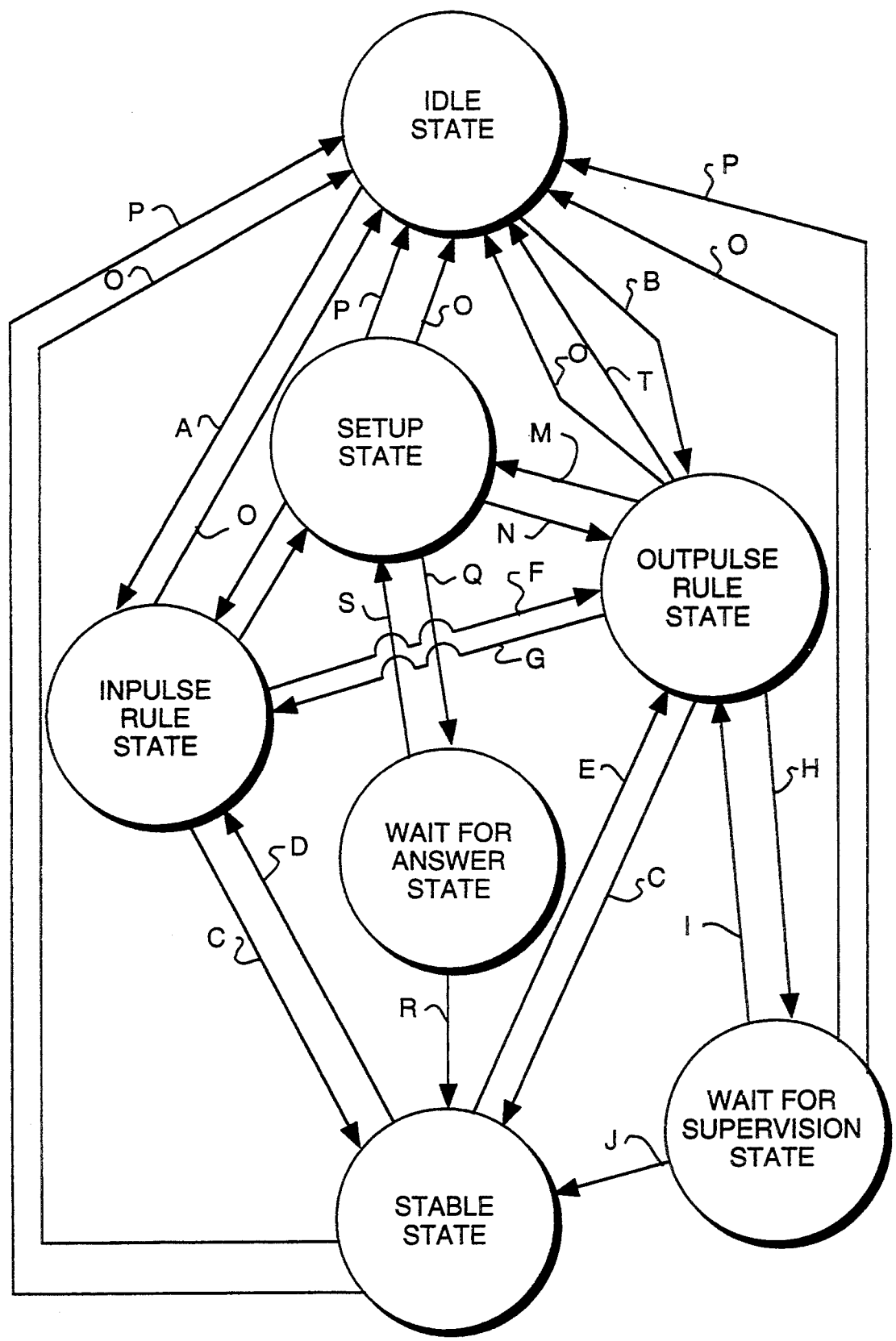
FIG. 11 is a state-transition diagram for a finite-state machine that the call processor implements for each call.

So long as a call is being processed, the call processor associates with that call one of the "states" depicted in FIG. 11. The IDLE state in the drawing represents the condition in which the call does not yet exist; the call processor has shut down the last call having the associated call identifier, and no new call having that call identifier yet exists. When a call comes into being, such as upon the receipt of a SETUP message (transition A in the drawing) or upon receipt of a command from the host to send such a message (transition B in the drawing), the call begins its path among the other states of the diagram in response to various events.

The importance of the states to the present discussion is limited to the fact that the behavior of the call processor in response to certain of the tokens depends on the current state, and part of the behavior that certain tokens specify is to change the current state. Accordingly, we describe the state transitions only in capsule form, by listing the events below that cause the various transitions shown in FIG. 11:

A. The Inpulse Rule state is entered from Idle state upon receipt of a D-channel SETUP message.

B. The Outpulse Rule state is entered from the idle state upon receipt of a host command to execute an Outpulse Rule.

C. The Stable state is entered from the Inpulse Rule state or the Outpulse Rule state if upon completion of the rule the host has logically associated an incoming call leg with another call leg and the calls on both legs have been answered.

D. The Inpulse Rule state is entered from the Stable state upon receipt of a host command to execute an Inpulse Rule.

E. The Outpulse Rule state is entered from the Stable state upon receipt of a host command to execute an Outpulse Rule.

F. The Outpulse Rule state is entered from the Inpulse Rule state upon execution of a 'DO RULE' or 'GOTO RULE' token that specifies an Outpulse Rule. In the case of 'DO RULE' the Inpulse Rule state is returned to upon completion of the Outpulse Rule. In the case of the 'GOTO RULE' the Inpulse Rule state is not entered upon completion of the Outpulse Rule.

G. The Inpulse Rule state is entered from the Outpulse Rule state upon execution of a 'DO RULE' for 'GOTO RULE' token that specifies an Inpulse Rule. In the case of 'DO RULE' the Outpulse Rule state is returned to upon completion of the Inpulse Rule. In the case of the 'GOTO RULE' the Outpulse Rule state is not entered upon completion of the Inpulse Rule.

H. The Wait for Supervision state is entered upon completion of an Outpulse Rule if there is an associated port and the call has not been answered.

I. The Outpulse Rule state is entered from the Wait for Supervision state upon host command.

J. The Stable state is entered from the Wait for Supervision state when a D-channel CONNECT message is received.

K. The Setup state is entered from the Inpulse Rule state if upon completion of the Inpulse Rule there is no associated port or, if there is an associated port, neither the call or the port that completes the Inpulse Rule nor the call on the associated port has been answered.

L. The Inpulse Rule state is entered from the Setup state upon a host command to execute an Inpulse Rule.

M. The Setup state is entered from the Outpulse Rule state if at the completion of the Outpulse Rule there is no associated port and the call on the port has been answered.

N. The Outpulse Rule state is entered from the Setup state from host command to execute an Outpulse Rule.

O. The idle state is entered following call clearing procedures.

P. Host command received which specifies disconnecting the call. Start call clearing procedures.

Q. The incoming port transitions to the Wait for Answer State when the host command begins an outpulse rule on the associated port.

R. The Stable State is entered by the incoming port if CONNECT is detected on the outgoing port.

S. The Setup state is entered when the outgoing port is disconnected and the incoming port remains active.

T. The Idle State is entered (following call-clearing procedures) from the Outpulse Rule state if during supervision processing a fail or error token was processed as the result of a data-channel event.

We now turn to a discussion of the tokens that the illustrated embodiment accepts as behavior-defining instructions. As was stated above, this discussion will proceed by means of a flow-chart description.

In FIG. 12A, block 1212 represents invocation of an inpulse rule. This can occur, as the example illustrated, because of the receipt of a SETUP message, because of the receipt from the host of a command that invokes an inpulse rule, or, as will be described below, by encountering a token, during processing of another rule, that invokes inpulse-rule processing.

Invocation of an inpulse rule begins a process of token-by-token execution. The first step, represented by block 1214, is the determination of whether any further tokens remain. So long as the previous token was not the last token, the call processor proceeds to identify the next token. One type of token, described in the example above, is the ISDN RX token. Block 1216 represents branching on whether the current token is an ISDN RX token. If it is not, the call processor determines whether the token is a reporting-control token, as block 1218 indicates.

There are four types of reporting-control tokens: REP END, NO REP, REP EACH, and REP NEXT. The function of each of these tokens is to cause the setting or resetting of a flag. Rule processing begins with a REP END flag set. So long as this flag is set, a report will be generated at the end of the rule's execution. The NO REP token resets that flag. The REP EACH and REP NEXT tokens set respective REP EACH and REP NEXT flags for purposes that will be described later. If one of these reporting-control tokens is encountered, the call processor sets or resets the appropriate flag, as block 1220 indicates. The routine then loops back to consider the next token.

If the result of the block-1218 determination was negative, the call processor determines whether the token under consideration is of the DO RULE type. There are two types of DO RULE tokens, the DO IRULE token for inpulse-rule processing and the DO ORULE token for outpulse-rule processing. Such a token includes an argument, so a typical token might be "DO IRULE 3," which specifies that inpulse rule no. 3 should be processed but that the current rule should resume after the end of that rule's processing. Block 1224 thus represents the processing of the invoked rule, after which the routine loops back to consideration of the next token. The next token may be a GOTO RULE token, which also is entered with an argument and invokes the rule that the argument indicates. It also has two varieties, the GOTO IRULE and GOTO ORULE tokens, which specify inpulse and outpulse rules, respectively. In the case of this token, however, control is transferred to the invoked rule: the call processor does not return to the current rule after the invoked rule has been processed. Block 1228 accordingly represents transfer to the new rule without looping back to the next token of the current rule after that processing.

Figure 12B:
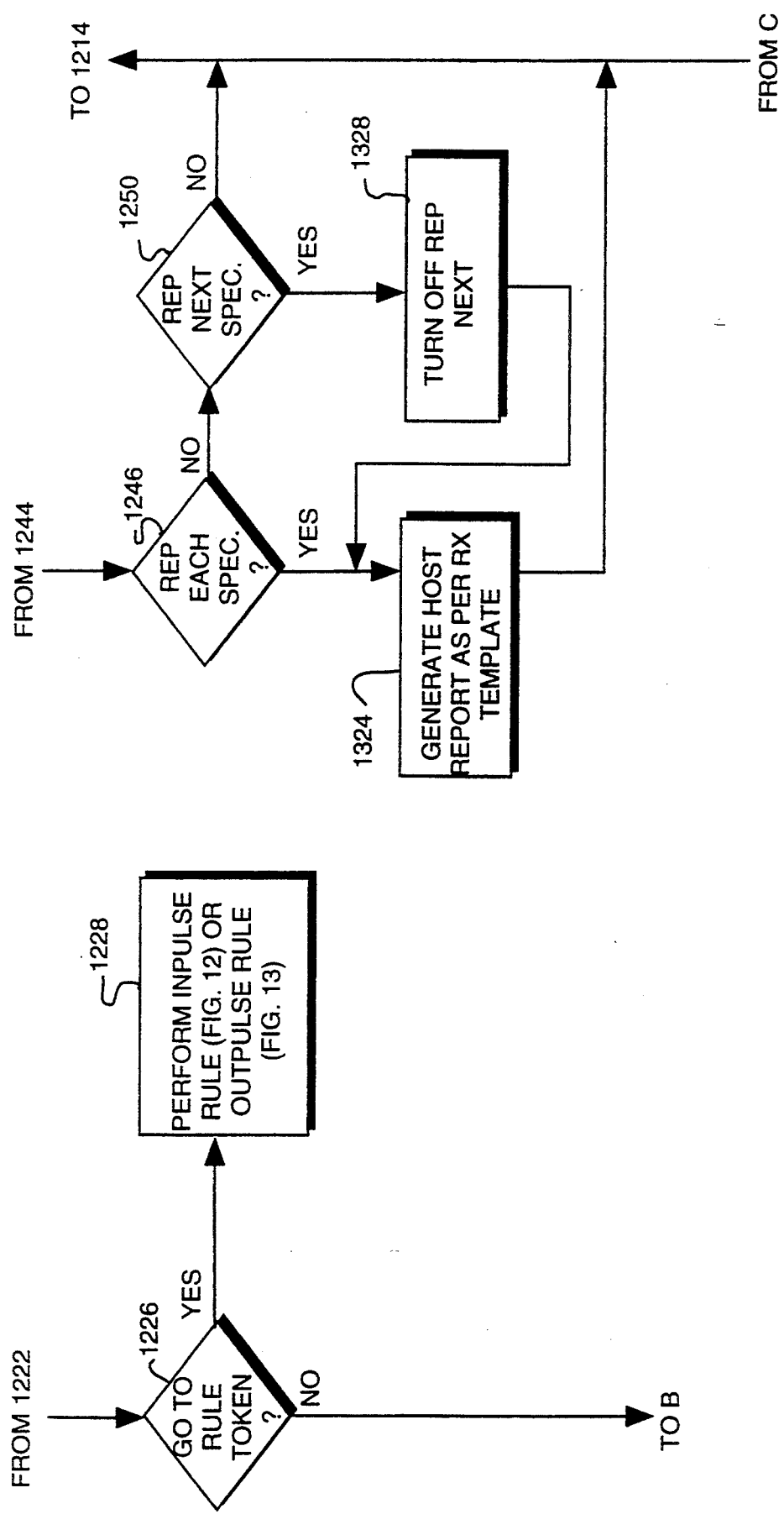

Another possible type of token is the WAIT TIME token, which also takes an argument, this one representing a delay, i.e., an amount of time that must elapse before processing of the rule continues. Block 1230 of FIG. 12B represents testing for this type of token, and block 1232 represents waiting for the indicated time interval before looping back to consider the next token.

The last type of token that can be encountered is the ISDN TX token, which was encountered in the example above. Block 1234 represents testing for this type of token, while block 1236 represents executing the template that the token designates.

We return to block 1216, which is the test for the token that represents a receive-message template.

If the token represents a receive-message template, the routine checks to determine whether that template specifies a message the same as that which caused entry into inpulse-rule processing, as block 1240 indicates. If not, the call processor waits until a message of the indicated type is received, as block 1242 indicates. When that message is received—or if the triggering message was the right one—then the inpulse-rule processing calls processing for the template that the token indicates, as Block 1244 indicates. When this processing has been completed, the call processor checks to determine whether the REP EACH flag has been set, as block 1246 indicates. If so, the call processor immediately generates a host report in accordance with the receive-message-template instructions, as Block 1248 indicates.

If the REP EACH flag is not set, the call processor determines whether the REP NEXT flag is, as Block 1250 indicates. If not, the routine loops back to Block 1214 and begins processing the next token. If REP NEXT is set, on the other hand, the call processor resets that flag, as Block 1252 indicates, and it generates the host report. Thus, the REP EACH and REP NEXT flags call for report generation immediately after a template has been processed, whereas the REP END token calls for report generation only when the processing of the current rule ends.

At some point, all of the tokens in the rule have been exhausted, and the result of test 1214 is affirmative. If the REP END flag is still set, the call processor sends a report to the host containing information that the rule has been completed and including any data that has been placed in report fields during any template processing that may have occurred. Blocks 1254 and 1256 represent these operations, after which the call processor ends processing of the current inpulse rule, as block 1258 indicates.

Figure 13A:
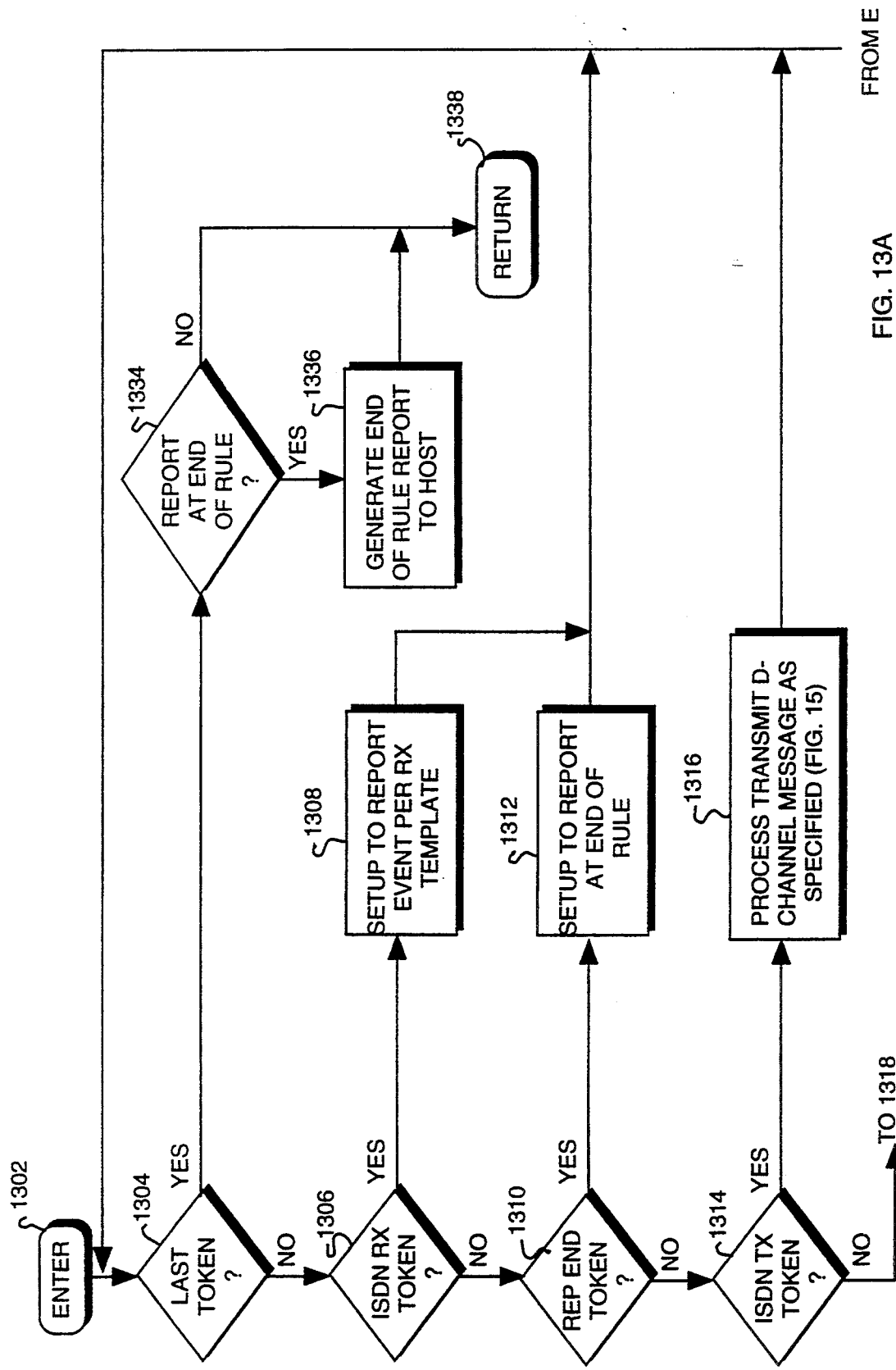
FIGS. 13A, 13B and 13C together constitute a flow chart of the routine that the call processor follows to process an outpulse rule.
Figure 13B:
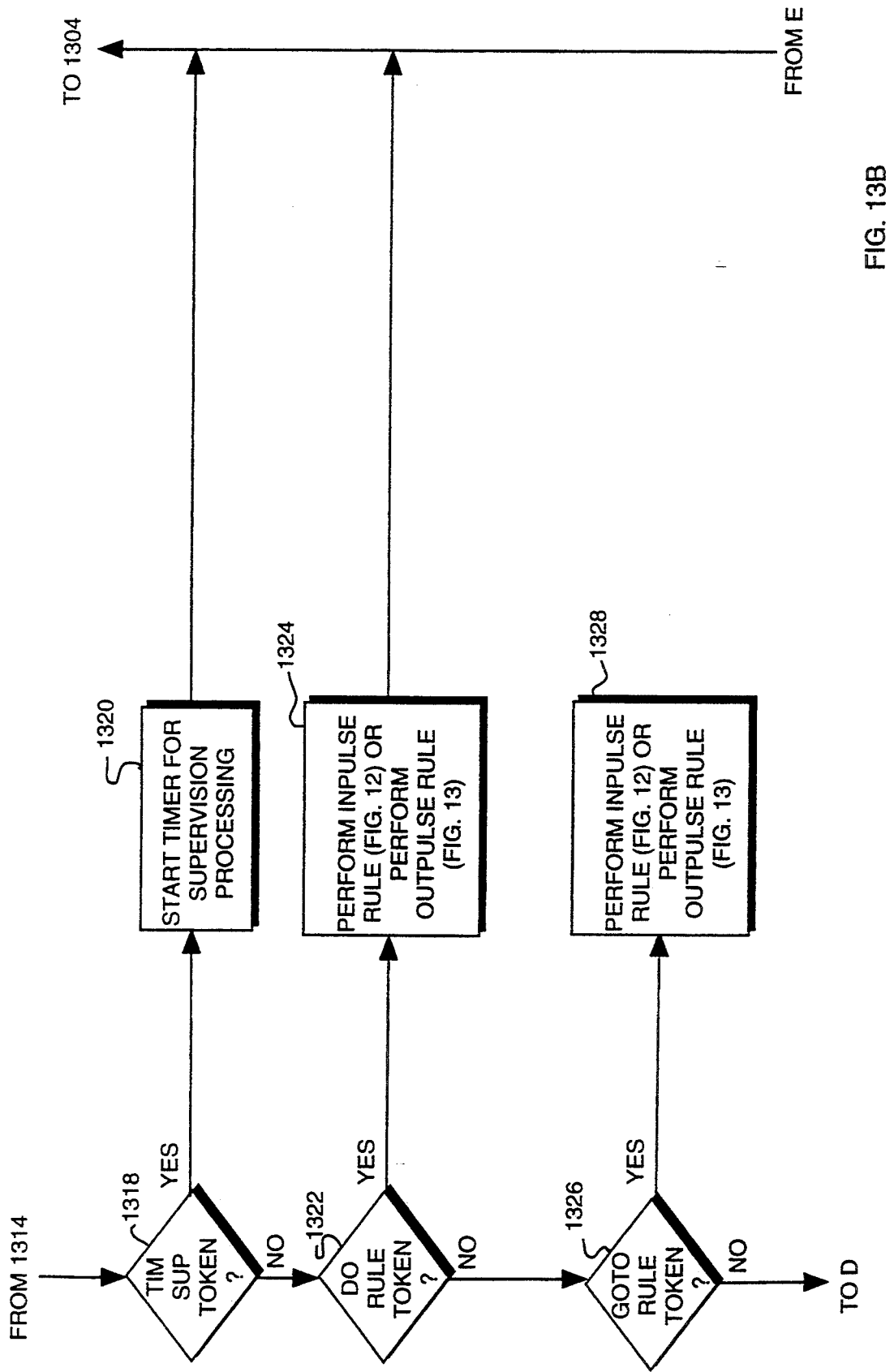

FIGS. 13A and 13B depict outpulse-rule processing. Block 1302 represents entry of the outpulse rule, either by a host command or by invocation in some other rule. Like the inpulse-rule-processing routine, the outpulse-rule-processing routine loops through sequential processing of the tokens. If, in accordance with block 1304, it is determined that the processing has not yet run out of tokens, the call processor determines whether the current token is a receive-template-specifying token, as block 1306 indicates. The response to such a token in an outpulse rule is different from that to such a token in an inpulse rule. Specifically, the outpulse rule does not immediately perform the steps that the indicated receive template specifies. Instead, it simply begins to monitor the data channel for the type of data-channel message with which the receive-message template is associated. Block 1308 represents this step. The routine then loops back to consider the next token while monitoring continues.

If the next token is an REP END token, the call processor sets the REP END flag, as blocks 1310 and 1312 indicate. If the next token is a transmit-message-template-indicating token, the call processor processes that token, as blocks 1314 and 1316 indicate.

It sometimes occurs that a supervision template specifies that some action be taken upon the expiration of a certain time interval. A TIM SUP token is used to begin a counter that counts down from the value entered as this token's argument. Blocks 1318 and 1320 represent starting the timer if such a token is encountered. As blocks 1322, 1324, 1326, and 1328 indicate, outpulse rules treat DO RULE and GOTO RULE tokens in a manner the same as that in which inpulse rules do.

If the next token is an ISDN SUP token, control is transferred to the supervision template thereby specified, and outpulse-rule processing is suspended while the data channel is monitored for events specified in the that template. Blocks 1330 and 1332 represent such a transfer. Upon completion of the supervision-template processing, outpulse-rule processing advances to the next token. If there is an affirmative result to test 1304—i.e., if all tokens have been exhausted, the call processor checks the REP END flag and generates a report, as blocks 1334 and 1336 indicate. Rule processing then ends, as block 1338 indicates.

Figure 14A:
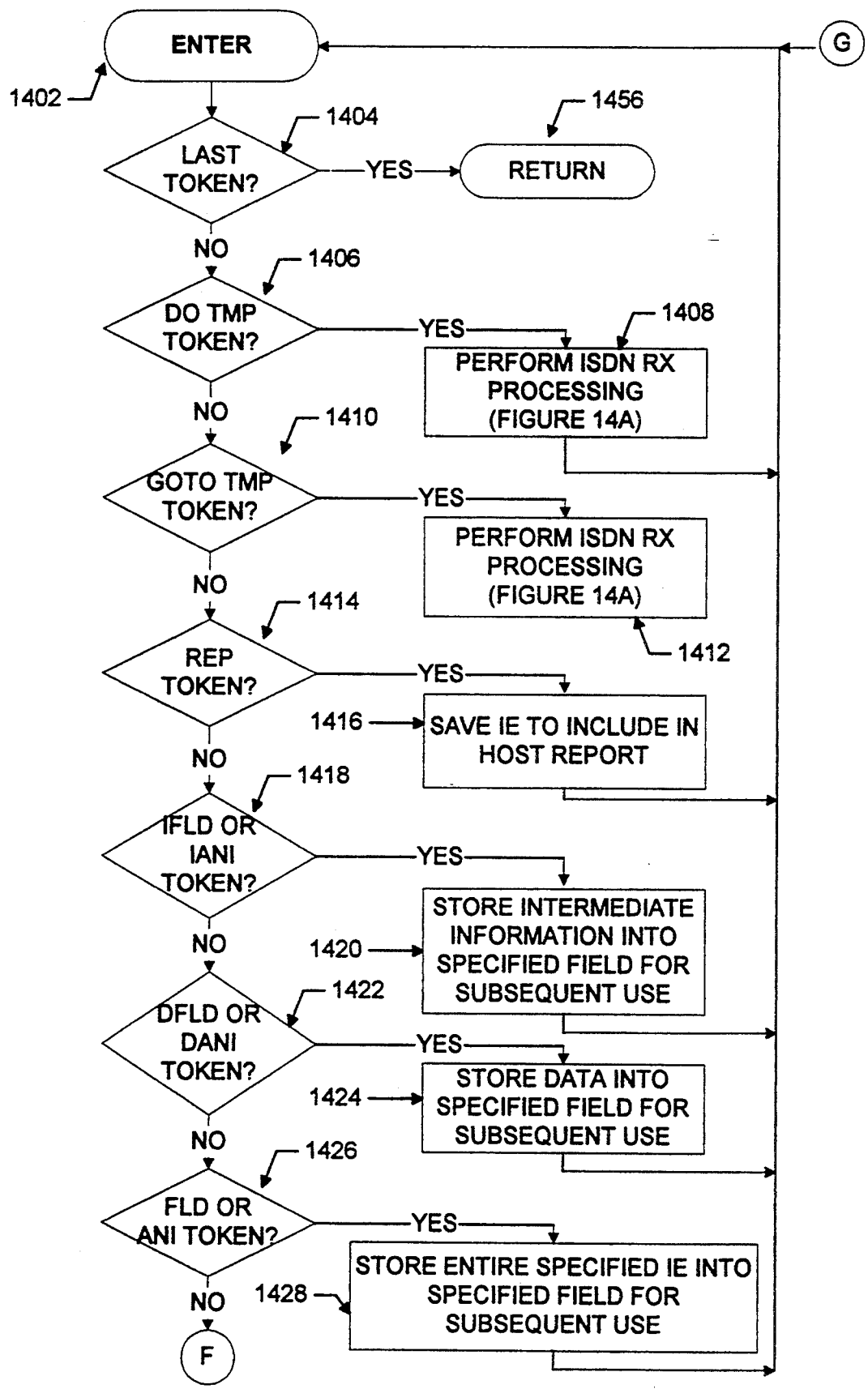
FIGS. 14A, 14B and 14C together constitute a flow chart of a routine that the call processor follows to process a receive-message template.
Figure 14B:
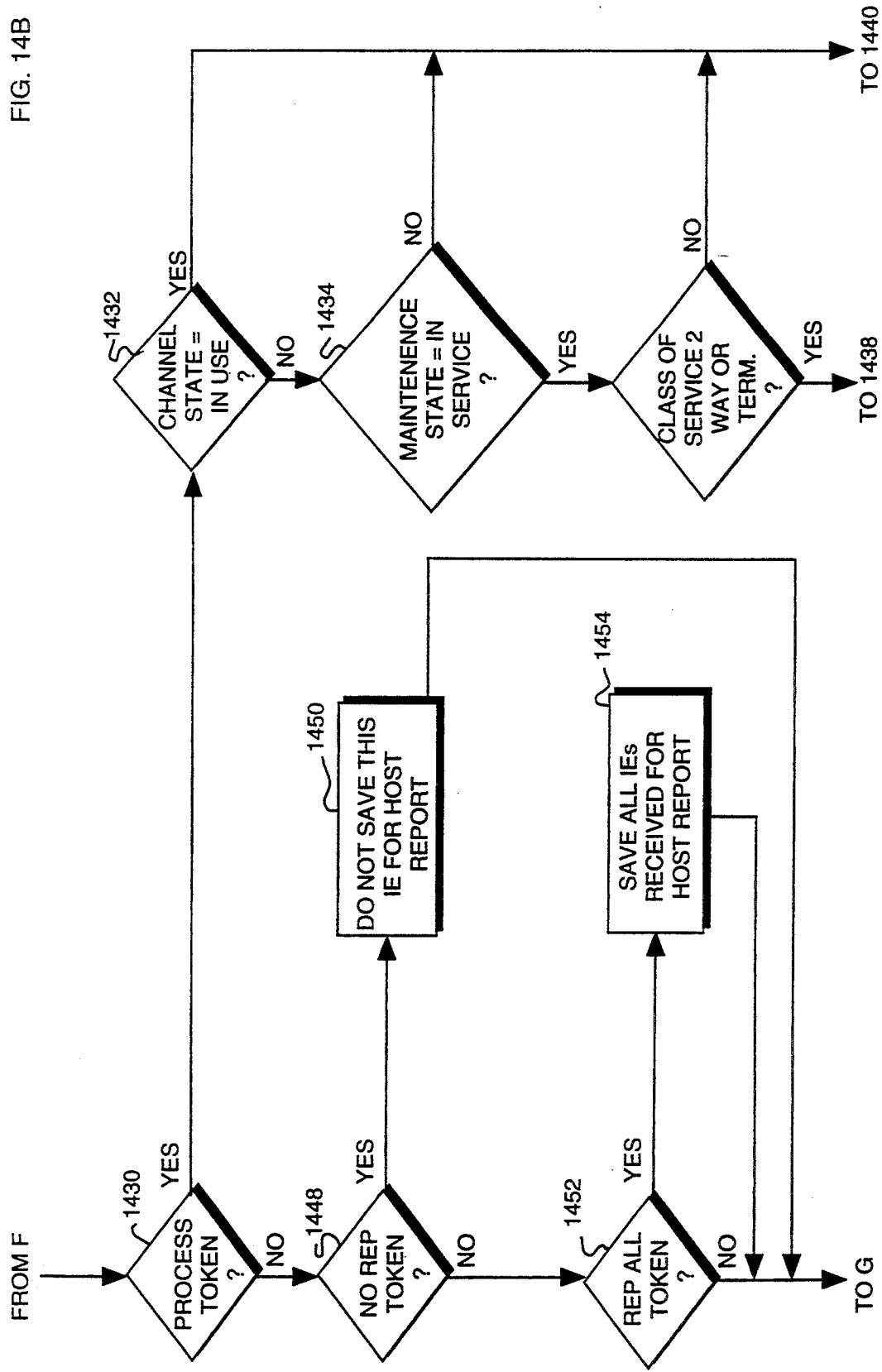
Figure 14C:
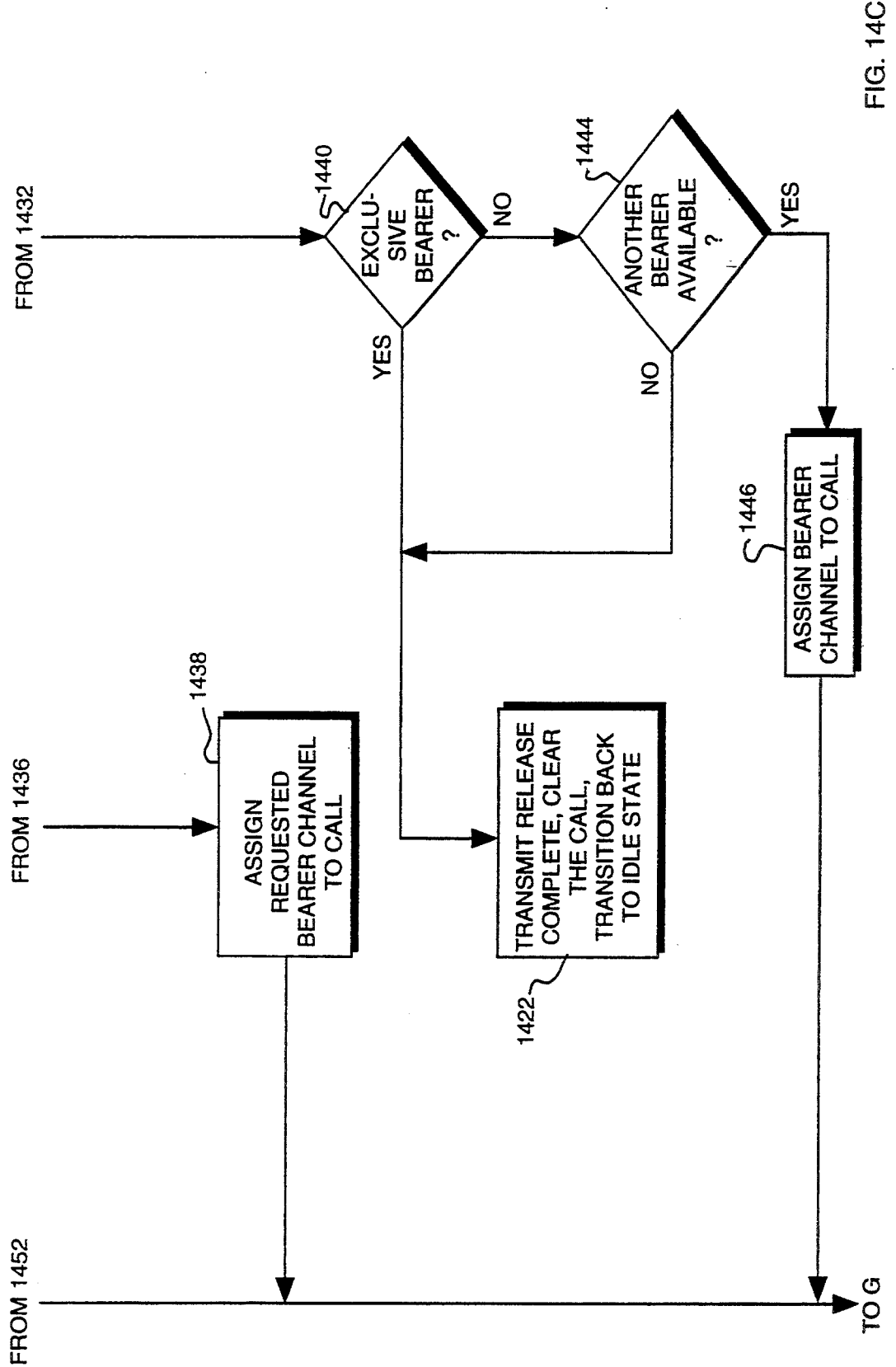

Steps 1244 of FIG. 12A and 1308 of FIG. 13A call for processing a receive-message template. FIGS. 14A and 14B represent processing of such templates. Block 1402 represents entering the routine, and block 1404 represents testing, as usual, for whether any tokens remain in the template. One of the possible template tokens is the DO TMP token, which is analogous to the DO RULE token described in connection with blocks 1222 and 1322 except that it calls a template rather than a rule. When this token is encountered in a receive-message template, its argument can refer only to another receive template. Thus, blocks 1406 and 1408 represent the processing of another receive template if the DO TMP token is encountered. Once that template is processed, the calling template-processing routine of FIGS. 14A and 14B loops back to block 1404 again.

Another possible token is the GOTO TMP token, which is analogous to the GOTO RULE token except that it calls for a template-processing routine rather than a rule-processing routine. Its argument, too, must refer to a receive-message template, and blocks 1410 and 1412 represent turning control over to a routine for processing the called template without returning to that for the calling template.

Block 1414 represents determining whether the current token is a REP token. As the example showed, this token takes an argument that refers to a particular information element in the message whose receipt caused execution of the rule that called the template-processing routine of FIGS. 14A and 14B. For instance, "REP CD NUM" is such a token encountered in the example, and it directs the routine to hold the called-number information element of the received data-channel message for use in the report that will be generated and sent to the host at the end of the current rule's processing. Block 1416 represents this step.

As the example showed, it sometimes is also useful to store an information element for some other purpose, and this is the reason for the field-indicating tokens, of which three, IFLD, DFLD, and FLD were shown in the example. These represent storage of the intermediate part, the data part, or the entirety, respectively, of the information element indicated by one of the token's arguments into the subject call's field represented by the other of the token's arguments. As was indicated above, for instance, "IFLD 2 CP NUM" directs storage of only the intermediate part of the calling-party-number information element into the subject call's field no. 2. In addition to the fields that can be filled in response to the IFLD, DFLD, and FLD tokens, the illustrated embodiment includes a field that can similarly be filled by those further tokens IANI, DANI, and ANI. Blocks 1418, 1420, 1422, 1424, 1426, and 1428 represent the processing of both types of field-indicating tokens.

Another possible token that has already been encountered in the example is the PROCESS token, for which block 1430 of FIG. 14B tests. In the illustrated embodiment, there is only one possible argument for this token, namely, CHAN ID. As the example indicated, the purpose of this token is to direct the call processor to determine whether the bearer channel that the received SETUP message requests by means of its channel-ID information element is one that the call processor can use for the requested call. As was observed above, the peer call processor from which the received SETUP message was sent ordinarily "knows" whether any given bearer channel is in use, and it thus does not ordinarily request an in-use channel. Block 1432 represents checking the bearer channel's state, however, as an extra protection against errors.

If that bearer channel is not in use, the call processor further checks the channel's maintenance state, as block 1434 indicates. If the channel has not been taken out of service for maintenance, the routine proceeds to block 1436, which checks the class of service that the host has assigned to the channel. By assigning service classes, the host reserves bearer channels for particular uses. For instance, certain channels can be restricted to incoming calls only, or to outgoing calls only, or they can be made available for both.

If the tests of blocks 1432, 1434, and 1436 have all been passed, then the call processor assigns the call to the bearer channel requested in the incoming SETUP message that initiated it, and the routine loops back to process the next token. If any of these tests fails, however, the call processor checks the channel-ID information element in the received SETUP message, which not only contains the requested bearer channel's ID but also indicates whether the transmitting peer call processor would participate in the requested call if it were assigned to any other bearer channel. As blocks 1440 and 1442 indicate, such an indication in the incoming SETUP message results in the call processor's clearing the call. The manner in which call clearing occurs will be described below.

Ordinarily, however, the transmitting peer call processor can support the call on any of the other bearer channels in their common interface. The call processor therefore determines whether there are any other bearer channels available. Block 1444 represents this function, which includes performing tests similar to those of blocks 1432, 1434, and 1436. If no other bearer is available, the call processor clears the call. Otherwise, it assigns a different bearer channel to the call, as block 1446 indicates, and the routine loops back to processing of the next token.

The two remaining tokens that may be encountered in a receive-message template are NO REP and REP ALL. These tokens represent an alternative to the use of the REP token of block 1414 to specify which information elements of the received-data-field message should be included in the report to the host. REP ALL indicates that all of the information elements in the message should be included in the report, but the NO REP token, which takes an argument, can be used in conjunction with REP ALL to indicate exceptions. Therefore, a template that includes both REP ALL and NO REP CHAN ID specifies that all of the information elements should be reported except for the channel-ID information element. Blocks 1448, 1450, 1452 and 1454 represent this response.

As the flow chart indicates, the routine loops back to block 1404 and begins processing of the next token after each token has been identified and the appropriate action taken. If there are no further tokens, control is returned to the rule that called the receive template, as block 1456 (FIG. 14A) indicates.

The argument by which the REP, IFLD, IANI, DFLD, DANI, FLD, ANI, and NO REP tokens specify information elements can be either a token-like representation of the information-element type or the hexadecimal value of the actual information-element content. This capability enables the call processor not only to support the existing information-element type set but also to fashion unique or new information-element types, which some applications may require.

Figure 15A:
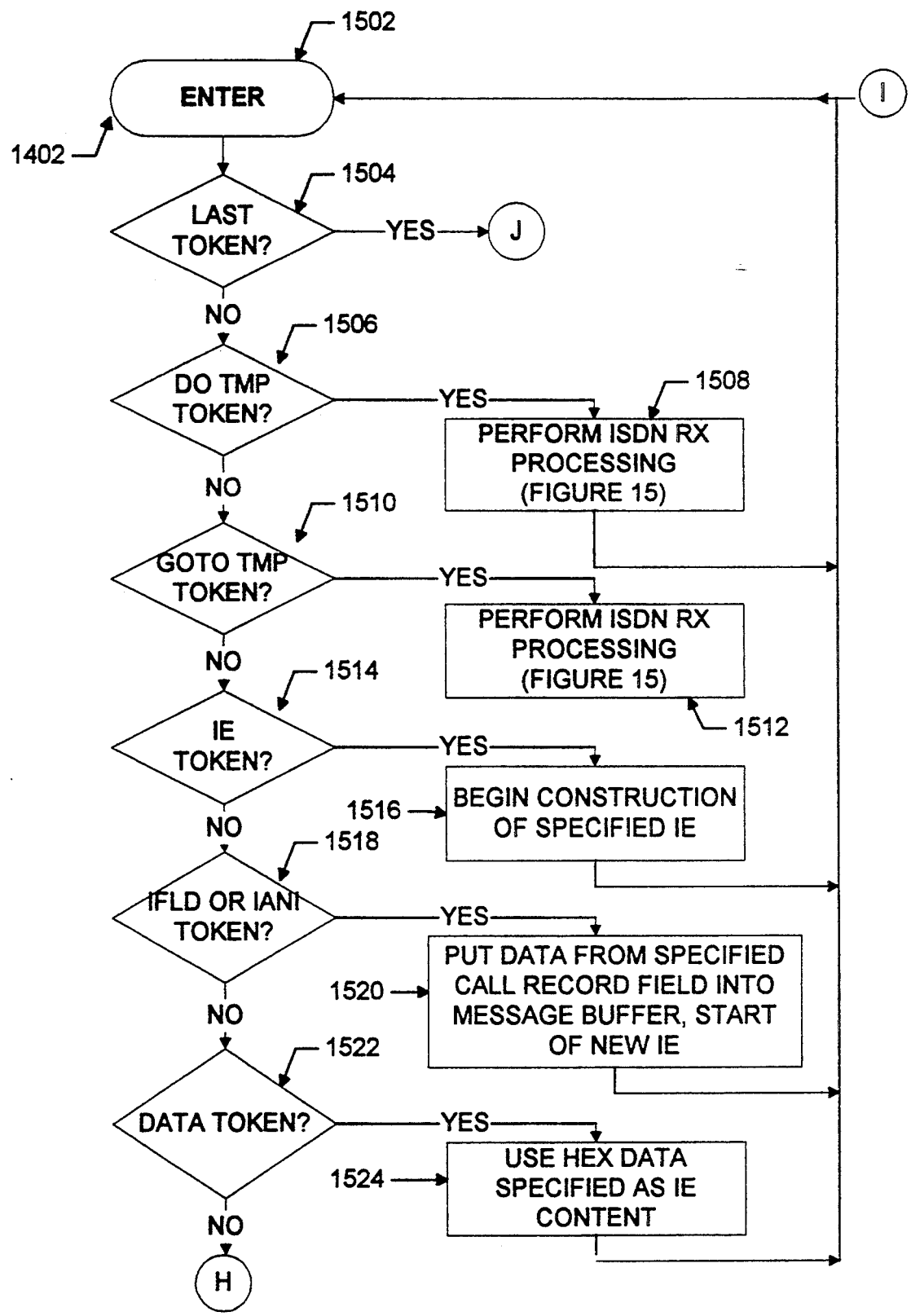
FIGS. 15A, 15B, and 15C together constitute a flow chart that represents the routine that the call processor follows in processing a transmit-message template.
Figure 15B:
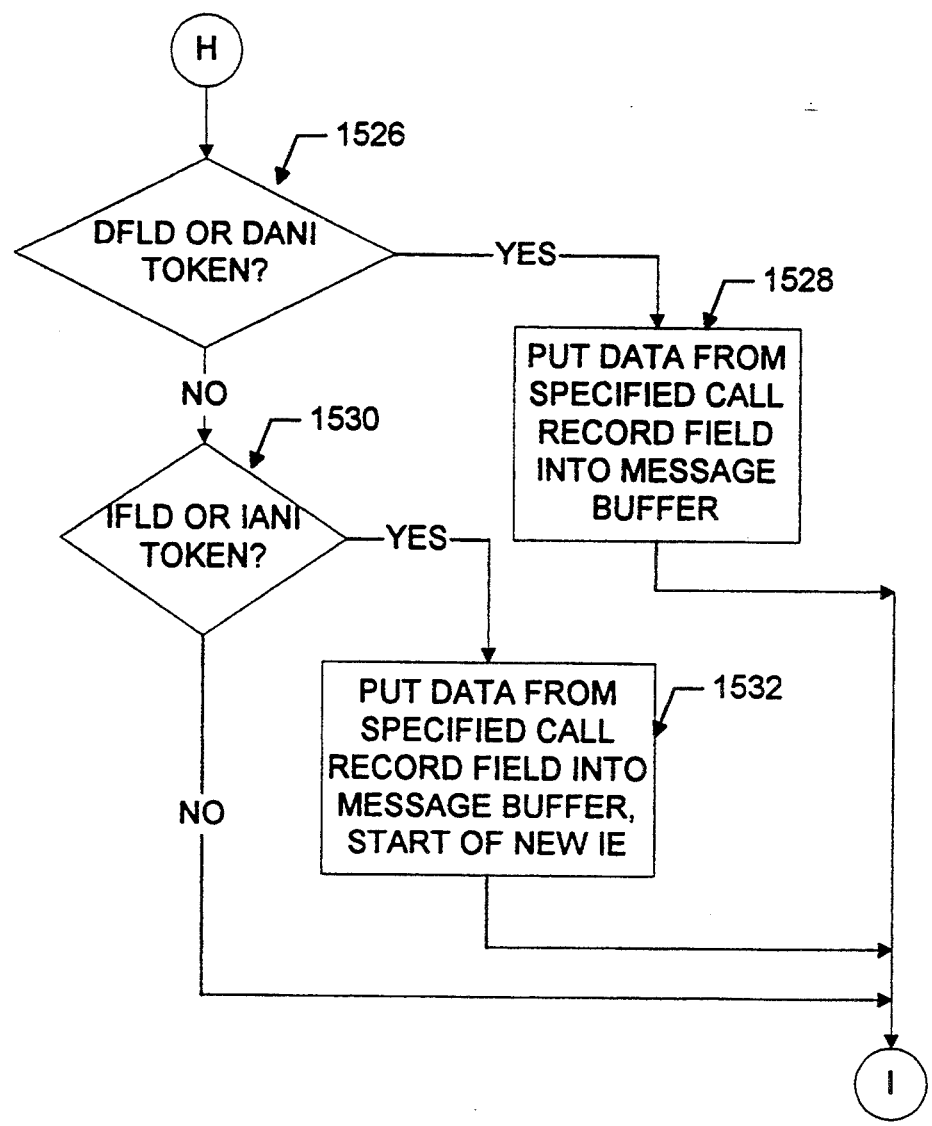
Figure 15C:
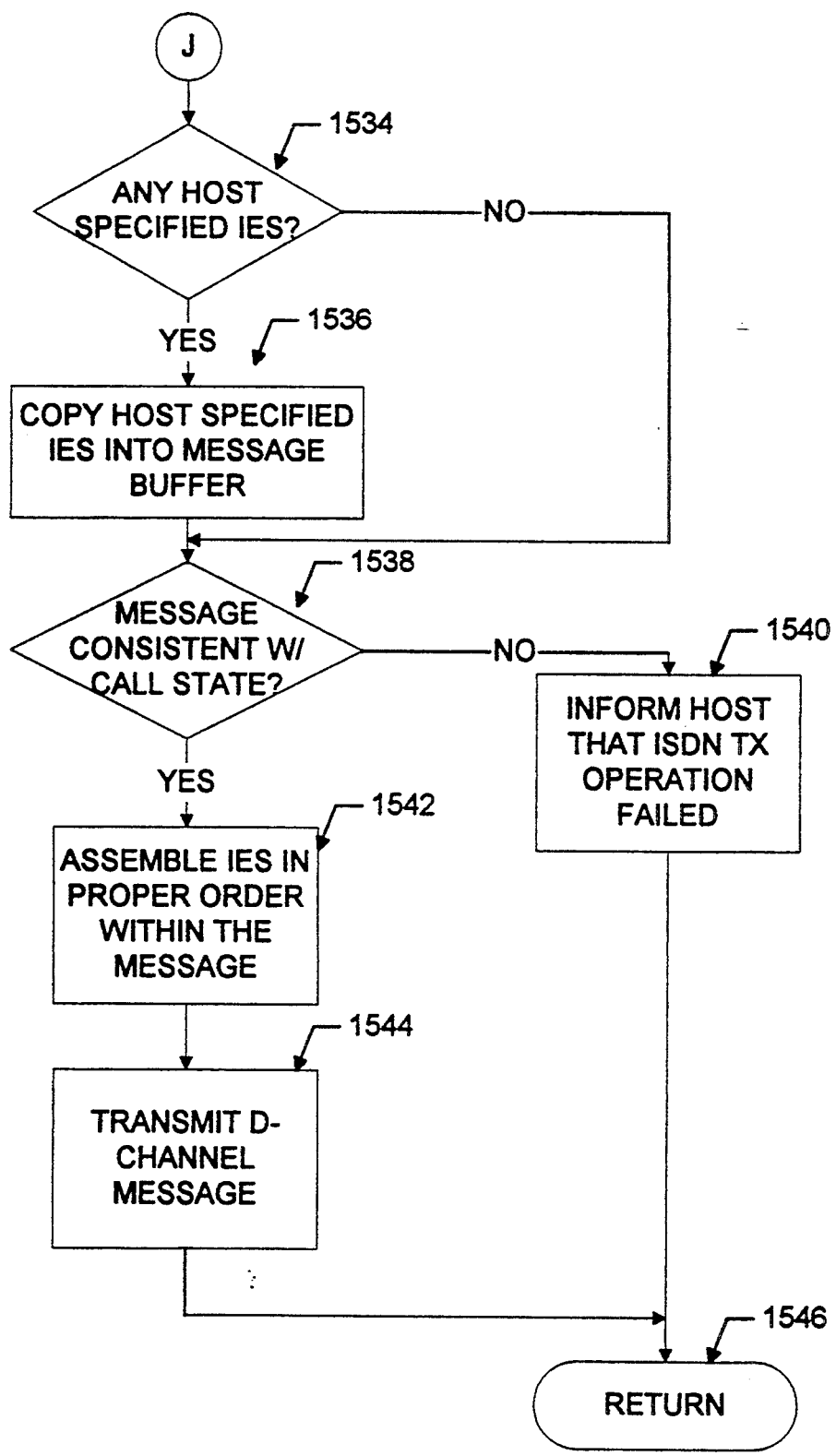

If that rule includes a transmit-message token, processing proceeds in a manner that FIG. 15A, 15B and 15C depict. Block 1502 of FIG. 15A represents entry into the template-processing routine, after which the usual check for the last token is made, as block 1504 indicates. Like the template-processing routine for receive messages, that for transmit messages checks for DO TMP and GOTO TMP tokens and processes the templates that those tokens' arguments indicate. In a transmit-message template, the argument of such a token must specify a transmit-message template. Blocks 1506, 1508, 1510, and 1512 represent detecting these tokens and processing the indicated templates. As FIG. 15A indicates, control returns to the calling template after template processing in response to a DO TMP token but not after template processing in response to a GOTO TMP token.

As the example showed, one possible token is the IE token, which directs the call processor to begin construction of an information element of the type indicated by that token's argument. For example, "IE CHAN ID" directs the call processor to begin forming an information element whose type indicater identifies it as a channel-ID information element. Blocks 1514 and 1516 represent this operation. The token or tokens that follow an IE token should be a literal-data-indicating DATA token or a data-only-type field-indicating token, i.e., a DFLD or DANI token, to indicate what the contents of the data portion of that information element are to be.

The IE token's argument does not have to be a tokenized representation of one of the predetermined information-element types. It can also be a hexadecimal representation of the bit stream that is to constitute that information element in the data-channel message. This capability enables the call processor to support not only the existing information-element type but also to fashion unique or new information-element types that future applications may require.

An alternate way of specifying the intermediate-information portion of an information element is to employ a token designating an intermediate-information-containing field, i.e., IFLD or IANI. Blocks 1518 and 1520 represent recognizing such a token and starting an information element as a result. Regardless of which way the information element is started, data-portion contents remain to be specified, and one way of doing so is to employ the DATA token. Block 1522 represents checking for such a token, and block 1524 represents interpreting the argument of such a token as a hexadecimal representation of the contents of the information element thereby started. Alternatively, the data portion can be specified by a token that designates a data-portion-containing field, i.e., a DFLD or DANI token. Block 1526 represents testing for such a token, and block 1528 represents placing the token contained in such a field into the information element being constructed.

As the example indicated by way of the fourth, fifth, and sixth tokens in the SETUP message template no. 8, the illustrated embodiment can combine the results of two data-content-designating tokens, so it is possible to use a literal-content-indicating DATA token together with a DFLD token to indicate the data contents of an information element being constructed.

As the example also indicated, it is possible to specify an information element for the message to be transmitted by reference to a field containing a complete information element; that is, the information element can be specified by a single token. This is the FLD or ANI token, for which block 1530 represents inspection. Block 1532 represents responding to an affirmative determination in step 1530 by copying the contents of the indicated field as a complete information element into the message being assembled.

As the flow chart has shown so far, the routine returns to block 1504 after performing the operation specified for each token and then proceeds to operate on the next token. If no token remains, however, and the result of test 1504 is therefore positive, the routine branches to the segment depicted in FIG. 15C, in which it assembles and transmits the message that the template tokens have defined. At this point, the routine has already gathered together the template-indicated information elements, but the command from the host that invoked the currently-executing rule may have included information elements, as the example showed. Block 1534 represents checking for this possibility, and block 1536 represents copying that information element into the message buffer.

For various reasons, errors may have occurred that result in the host's requesting a message that is inconsistent with the current call state. If a CONNECT message has already been sent, for instance, it is inappropriate to send another for the same call. Block 1538 accordingly represents checking for state consistency, and block 1540 represents the result of finding that the requested message is inconsistent with that state. If the requested message is inconsistent, a report of that fact is transmitted to the host, but the D-channel message is not transmitted.

Ordinarily, of course, the message is consistent with the current state, and block 1542 represents arranging the various information elements in their proper order. This having been done, the call processor transmits the thus-assembled message, as block 1544 indicates, and the call processor returns to the rule that called the transmit-message template, as block 1546 indicates.

As was indicated in connection with the example, the supervision template differs from the message templates in that its tokens are not arranged for sequential execution but are instead entered next to various events that might occur during rule processing. Supervision-template tokens indicate what is to happen upon the occurrence of those events. Specifically, the events are the receipt of one of several kinds of data channel messages and the timing out of a timer set by a TIM SUP token in a transmit-message template encountered in the same rule.

Figure 16A:
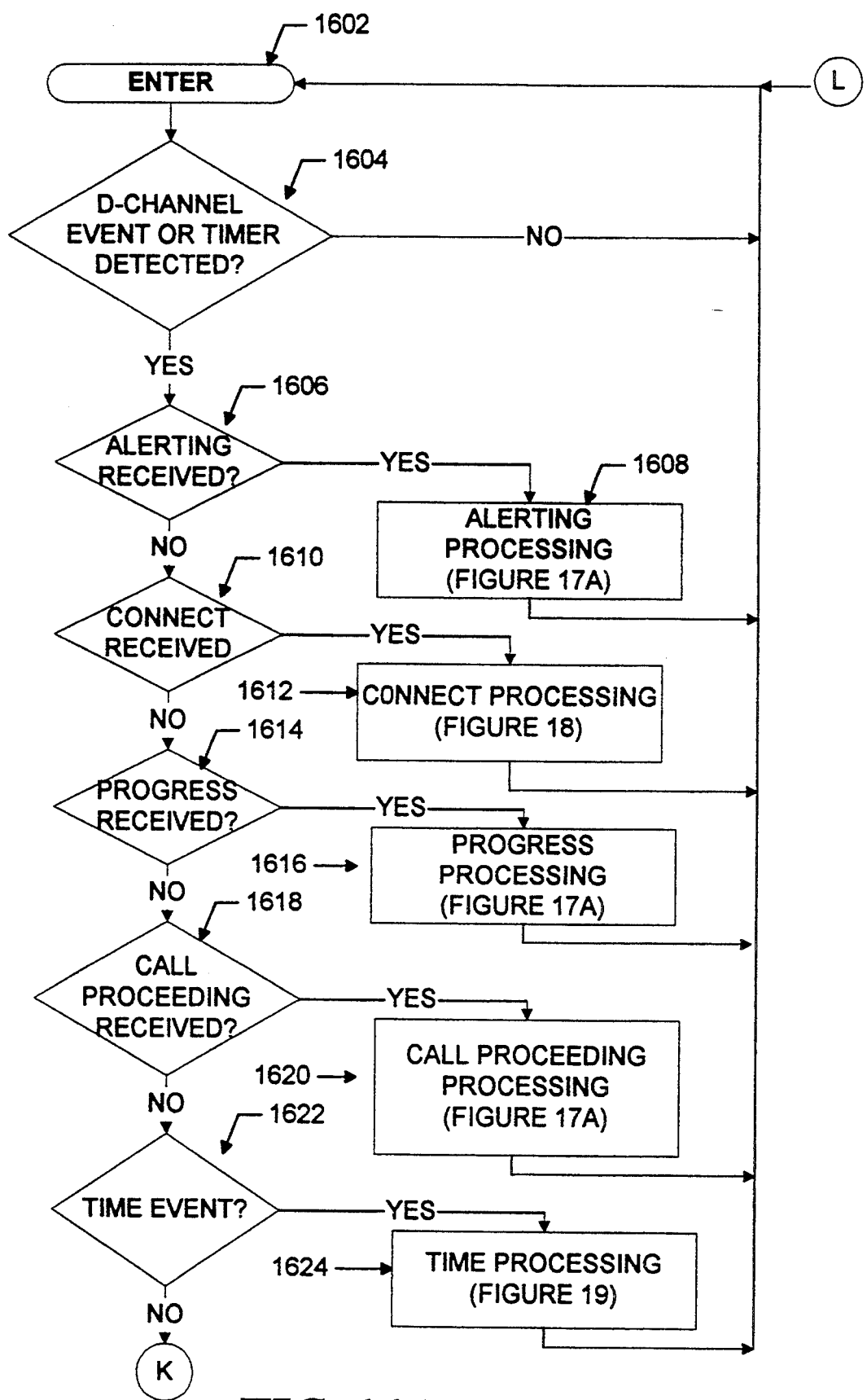
FIGS. 16A and 16B together constitute a flow chart that represents a routine that the call processor follows in processing a supervision template.
Figure 16B:
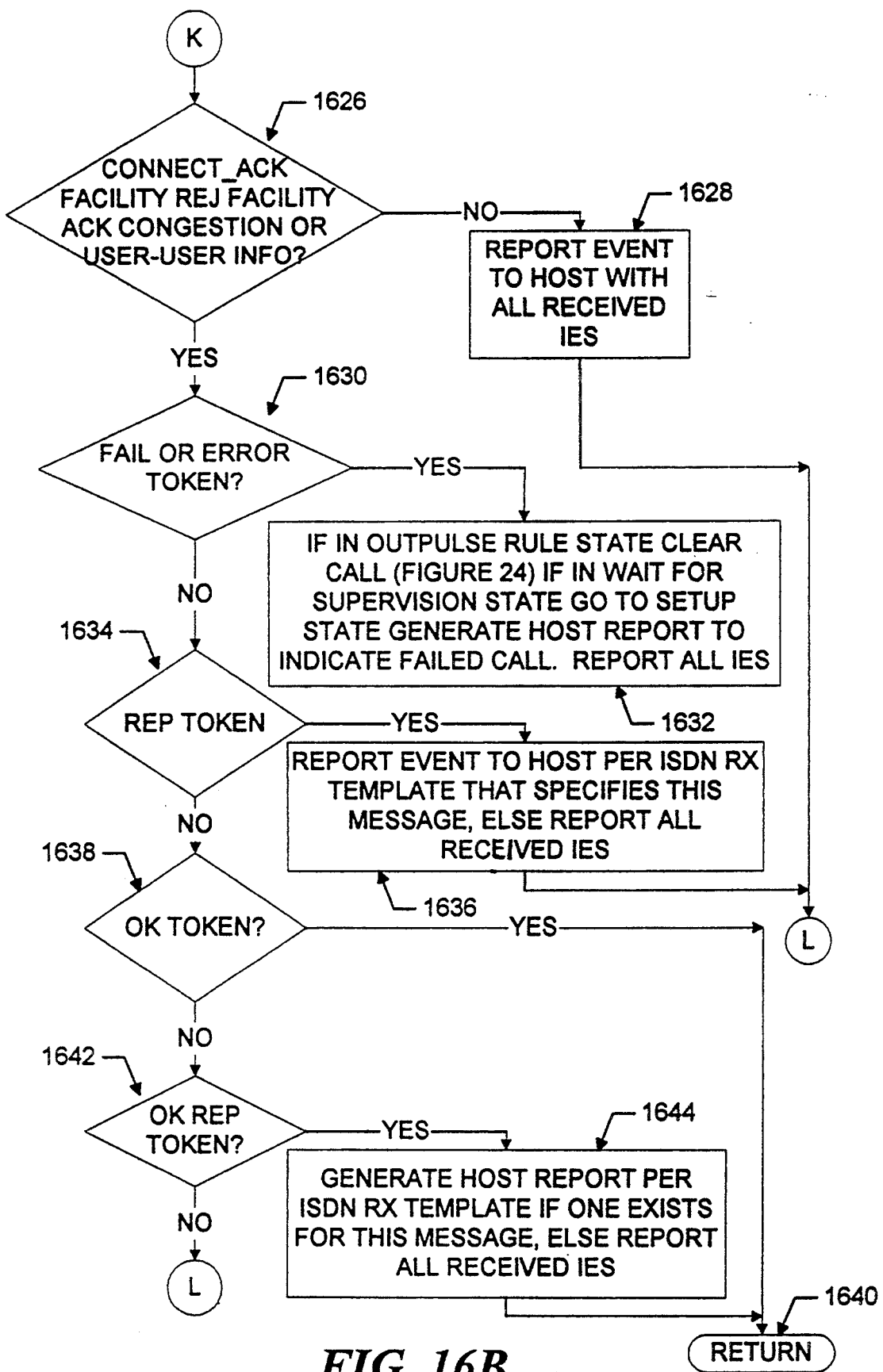

When the supervision-template-invoking token is encountered in rule processing, therefore, the call processor enters the supervision-template routine depicted in FIGS. 16A and 16B, in a step represented by block 1602. The routine then executes a loop whose only step is that represented by Block 1604 until a data-channel event is detected or the timer set in response to the TIM SUP token times out.

If the event is that the timer timed out or that an ALERTING, CONNECT, PROGRESS or CALL PROCEEDING message has been received, the routine of FIGS. 16A and 16B calls a respective subroutine, as blocks 1606, 1608, 1610, 1612, 1614, 1616, 1618, 1620, 1622, and 1624 indicate. Template processing then returns to step 1604 to await another event.

In the illustrated embodiment, the other events for which tokens can be entered in a supervision template are the CONNECT ACK, FACILITY REJ, FACILITY ACK, CONGESTION, and USER INFO messages received over the data channel. Other embodiments, of course, may provide the capability of processing other events. If the event that triggered leaving the block-1604 loop is neither any of these nor any of those listed in the left column of FIG. 16A, the routine reports the message that was received, together with all of the information elements that it contained, to the host and returns to block 1604, as blocks 1626 and 1628 indicate. If the event was one of the five messages for which block 1626 tests, on the other hand, the routine proceeds to check the token that was entered in the template row corresponding to the received message.

If the received message is one of the five messages listed in block 1626 and the token entered in the supervision template for that message is a FAIL or ERROR token, the call is shut down by performing the disconnect procedures described below; the state of the call (FIG. 11) goes from the outpulse-rule state to the idle state. In this situation, the call in question will always be the outgoing call, but the state of the incoming call with which it is associated must also be affected. This call, which will have been in the wait-for-answer state (FIG. 11), is returned to the set-up state, and a report for the subject, outgoing call, together with all information elements of the received message, is made to the host processor. Rule processing for the subject, outgoing call thus ends.

If the entered token is the REP token, the call processor generates a report to the host in accordance with any received template in that rule that corresponds to the received message, and the report is sent to the host immediately, rather than at the end of rule processing. If the rule includes a receive-message template for that particular received data-channel messages, the report is generated in accordance with that template. Otherwise, the report includes all of the information elements that the message contains. Blocks 1634 and 1636 represent this response.

The routine then returns to block 1604 and the monitoring loop. The presence of the OK or OK REP token in the row corresponding to the received message (in the case of one of the five messages of block 1626) causes supervision-template processing to end. An OK token causes supervision-template processing to end immediately, as blocks 1638 and 1640 indicate, although outpulse-rule processing continues with block 1304 of FIG. 13A. The OK REP token causes supervision-template processing to end after a report of the received message is sent to the host processor, as blocks 1642 and 1644 indicate. If the rule includes a receive-message template for that particular received data-channel message, the report is generated in accordance with that template. Otherwise, the report includes all of the information elements that the message contains.

As the flow chart indicates, the only internal mechanism for leaving the template-processing routine is the presence of an OK token, which is not included in every supervision template. Thus, supervision-template processing ordinarily lasts so long as the invoking rule is enforced. When rule processing ends, of course, so does processing of any supervision template that it invokes.

Figure 17A:
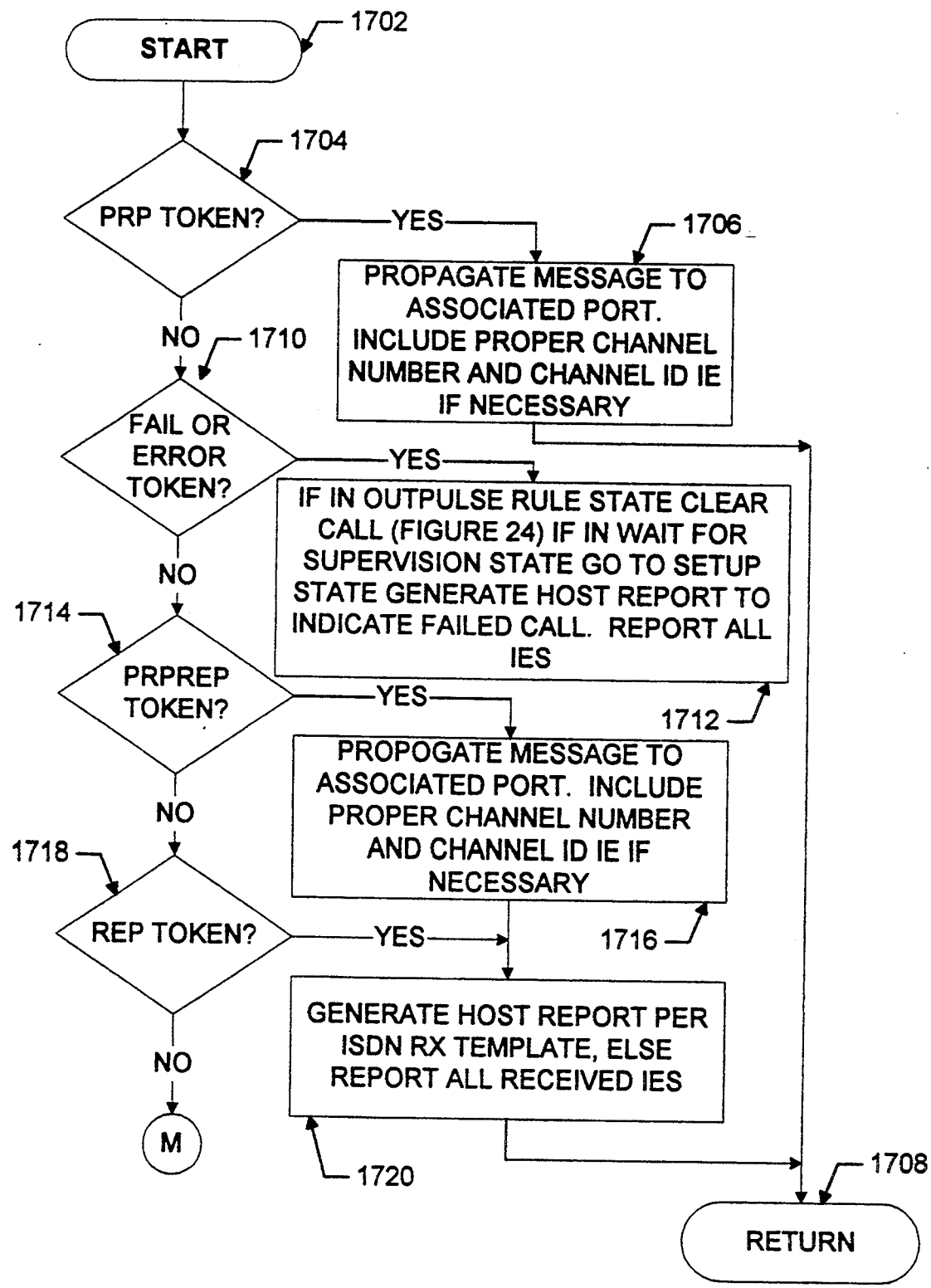
FIGS. 17A and 17B together constitute a flow chart of a sub routine called by the routine of FIGS. 16A and 16B in response to receipt of certain types of messages.
Figure 17B:
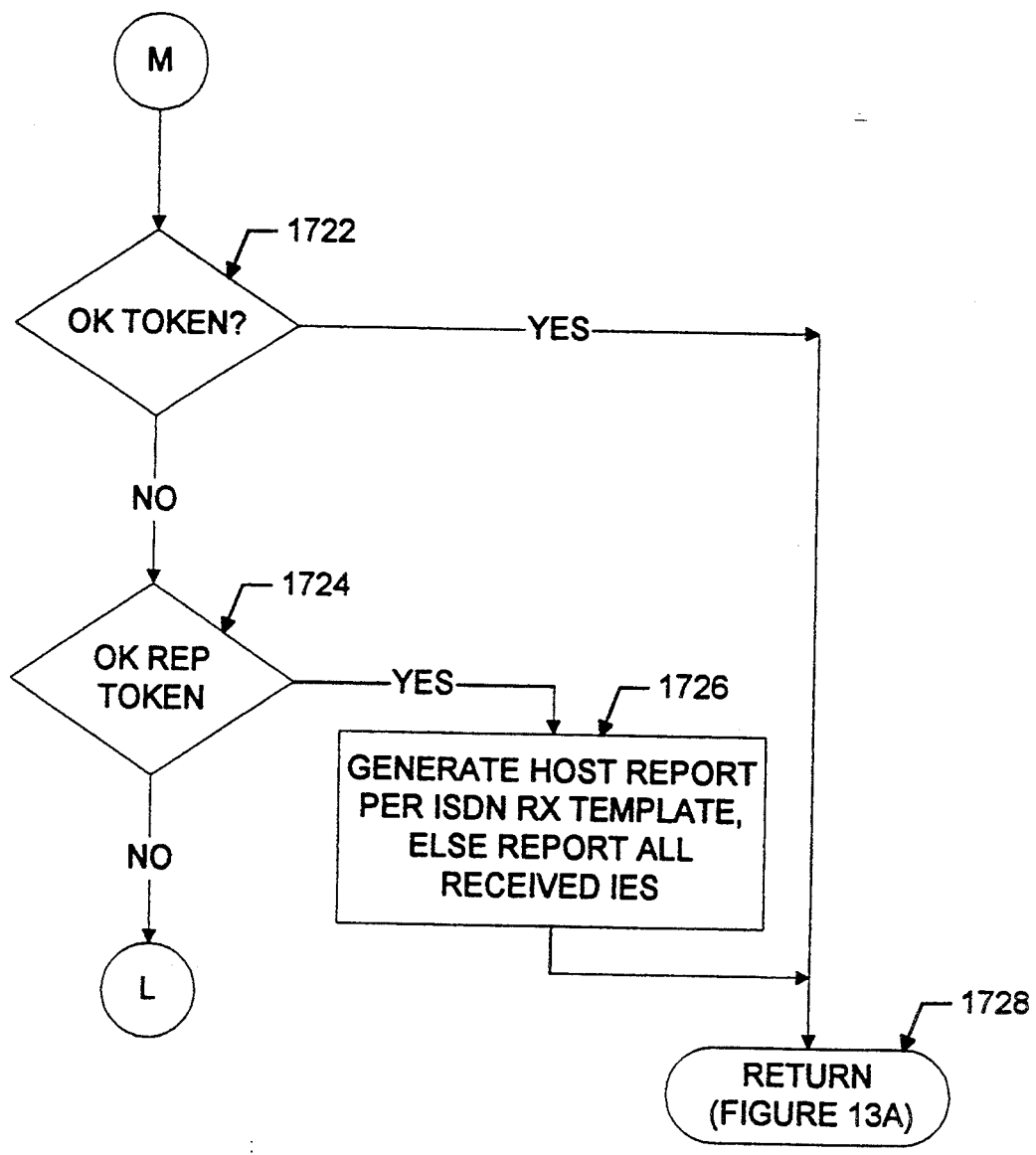

FIGS. 17A and 17B depict the processing represented by blocks 1608, 1616, and 1620 of FIG. 16A; that is, they represent the processing that occurs in a supervision template when an ALERTING, PROGRESS, or CALL PROCEEDING message is received. Block 1702 represents entry into this routine. If the supervision-template entry for the received message is PROPAGATE, the call processor forwards the received message over the bearer channel that supports the associated call, possibly after having modifying the received message, if the protocol so dictates, so that it includes the channel number and channel-ID information element of the associated call. Blocks 1704 and 1706 represent this operation, after which the call processor returns to the routine of FIG. 16A, as block 1708 indicates.

A FAIL or ERROR token in the row for the received message is processed in a manner identical to that in which such tokens were described as being processed in connection with blocks 1630 and 1632 of FIG. 16B. Blocks 1710 and 1712 represent this processing in the subroutine of FIG. 17A.

A PRPREP token in the row associated with the received data-channel message results in processing similar to that which the PROPAGATE token causes, except that the PRPREP token additionally causes a report of the received message to be sent to the host in accordance with any receive-message template for that received message. If the rule invokes no such template for that rule, the report contains all of the received message's information elements. Blocks 1714 and 1716 represent this operation.

Blocks 1718 and 1720 indicate that processing in response to a REP token similarly causes transmission of a report to the host.

Blocks 1722, 1724, and 1726 indicate that the OK and OK REP tokens operate as was described in connection with blocks 1638, 1642, and 1644 of FIG. 16B. Block 1728 indicates that supervision processing then terminates. Execution of the outpulse rule then continues with block 1304 of FIG. 13A.

Figure 18:
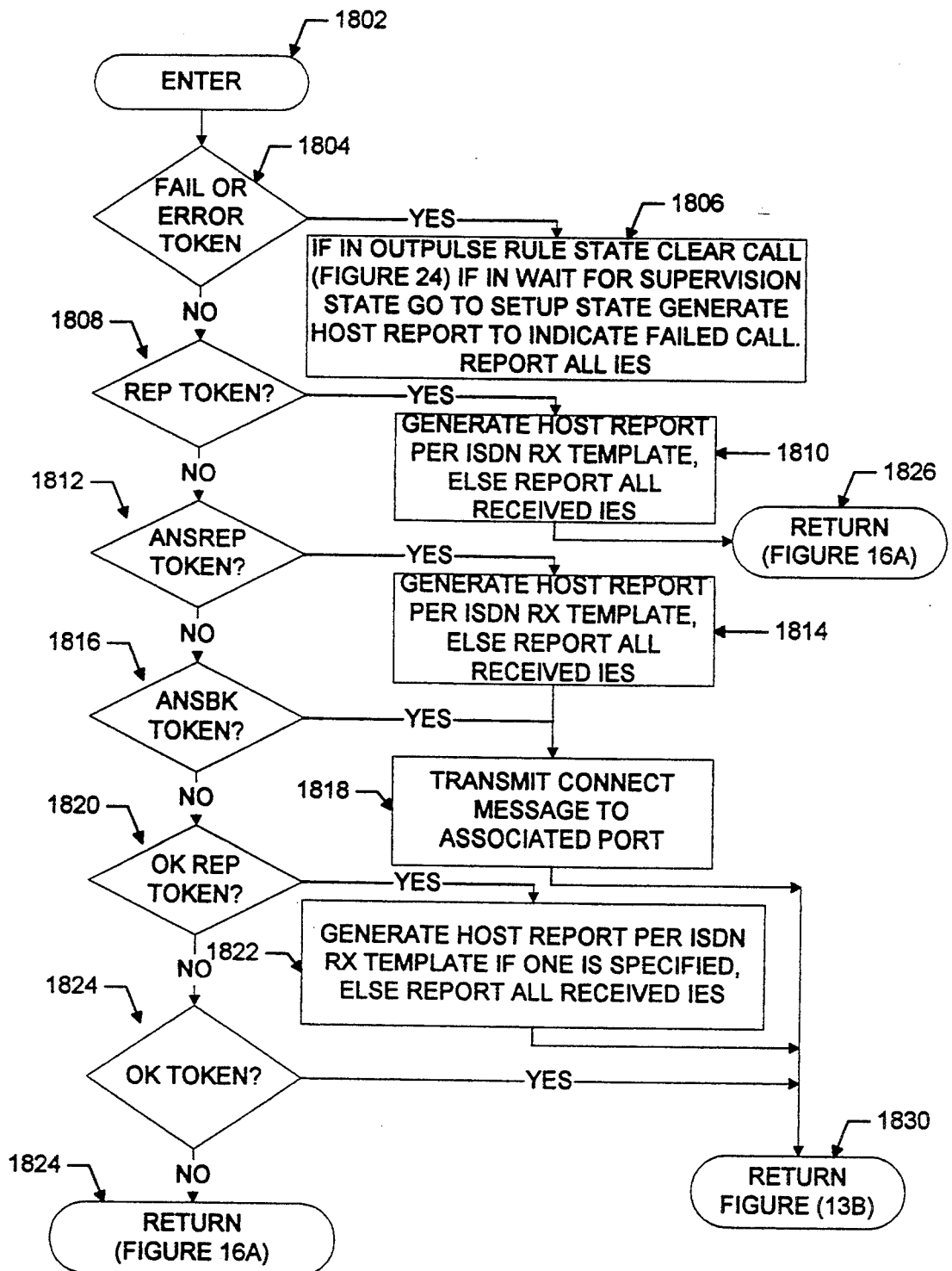
FIG. 18 is a flow chart of a sub routine similarly called by the routine of FIGS. 16A and 16B in response to receipt of a CONNECT message.

FIG. 18 depicts the CONNECT-token processing represented by Block 1612 of FIG. 16A. Block 1802 represents entry into this portion of the supervision-template-processing routine, and Blocks 1804, 1806, 1808, and 1810 indicate that the FAIL, ERROR, and REP tokens are processed for a CONNECT message just as they are for the ALERTING, PROGRESS, and CALL PROCEEDING messages.

Another token that can be included in a CONNECT-message template is the ANSREP token, and the routine of FIG. 18 tests for this token, as block 1812 indicates. This token, which is allowable only in CONNECT-message templates directs that a CONNECT message be transmitted to the channel associated with that over which the triggering CONNECT message was received. It also directs that a report be sent to the host computer, just as the REP token does. Block 1814 represents the steps.

Another possible token, ANSBK, directs transmission of a CONNECT message just as ANS REP does, but without the report to the host processor, as blocks 1816 and 1818 indicate.

The OK REP and OK tokens have the same meaning for CONNECT-message templates as they do for ALERTING, PROGRESS, and CALL PROCEEDING template, as Blocks 1820, 1822, and 1824 indicate.

As Blocks 1826 and 1828 indicate, completion of the processing for the CONNECT message results in continuation of supervision-template processing. If the token for the CONNECT message is ANS REP, ANSBK, OK REP, or OK, supervision processing ends, as block 1830 indicates, and execution of the outpulse rule continues with block 1304 of FIG. 13A.

Figure 19:
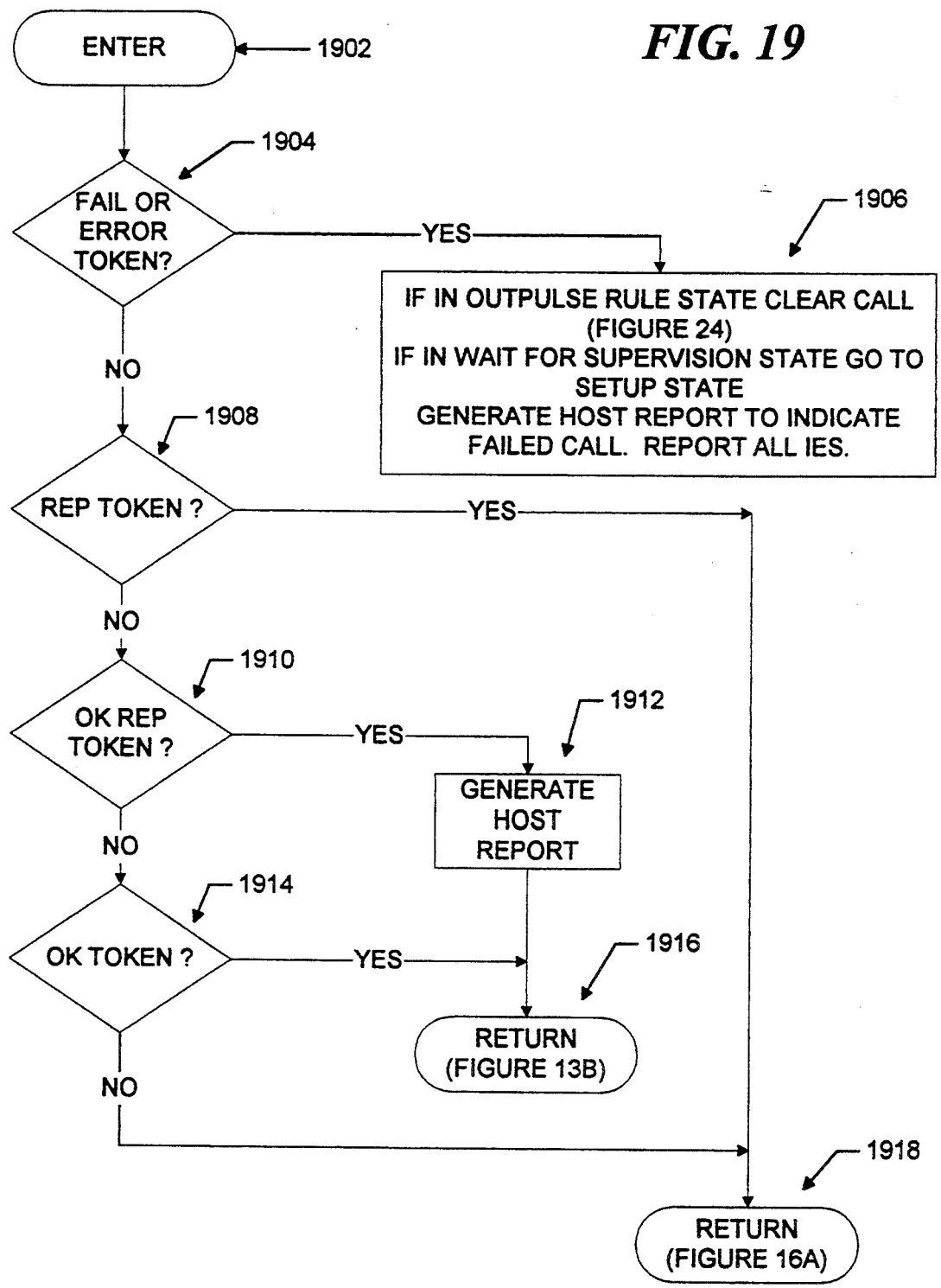
FIG. 19 is a flow chart of a sub routine that the routine of FIGS. 16A and 16B calls in response to the timing out of a timer that the call processor provides.

As was described above, the operator can direct that a timer begin to count down at some point within rule execution. The timing out of this timer is an event to which the supervision template responds just as it does to data-channel messages, and FIG. 19 depicts the routine that the call processor follows in responding to this event. Block 1902 represents entering this routine, while Blocks 1904, 1906, 1908, 1910, 1912, 1914, 1916, and 1918 indicate that all of the possible tokens, namely, FAIL, ERROR, REP, OK REP, and OK, are processed in a manner the same as that in which they are processed for other events.

While the foregoing flow charts have described the operations that the call processor performs in response to directions from explicit operator programming, there are certain functions of a similar nature that the call processor performs without any such explicit operator programming; these are pre-programmed features. These functions are performed when the call processor clears a call and when the processor is in the set up, wait-for-supervision, and stable states described in the state-transition diagram of FIG. 11. The next several flow charts describe these functions.

Figure 20:
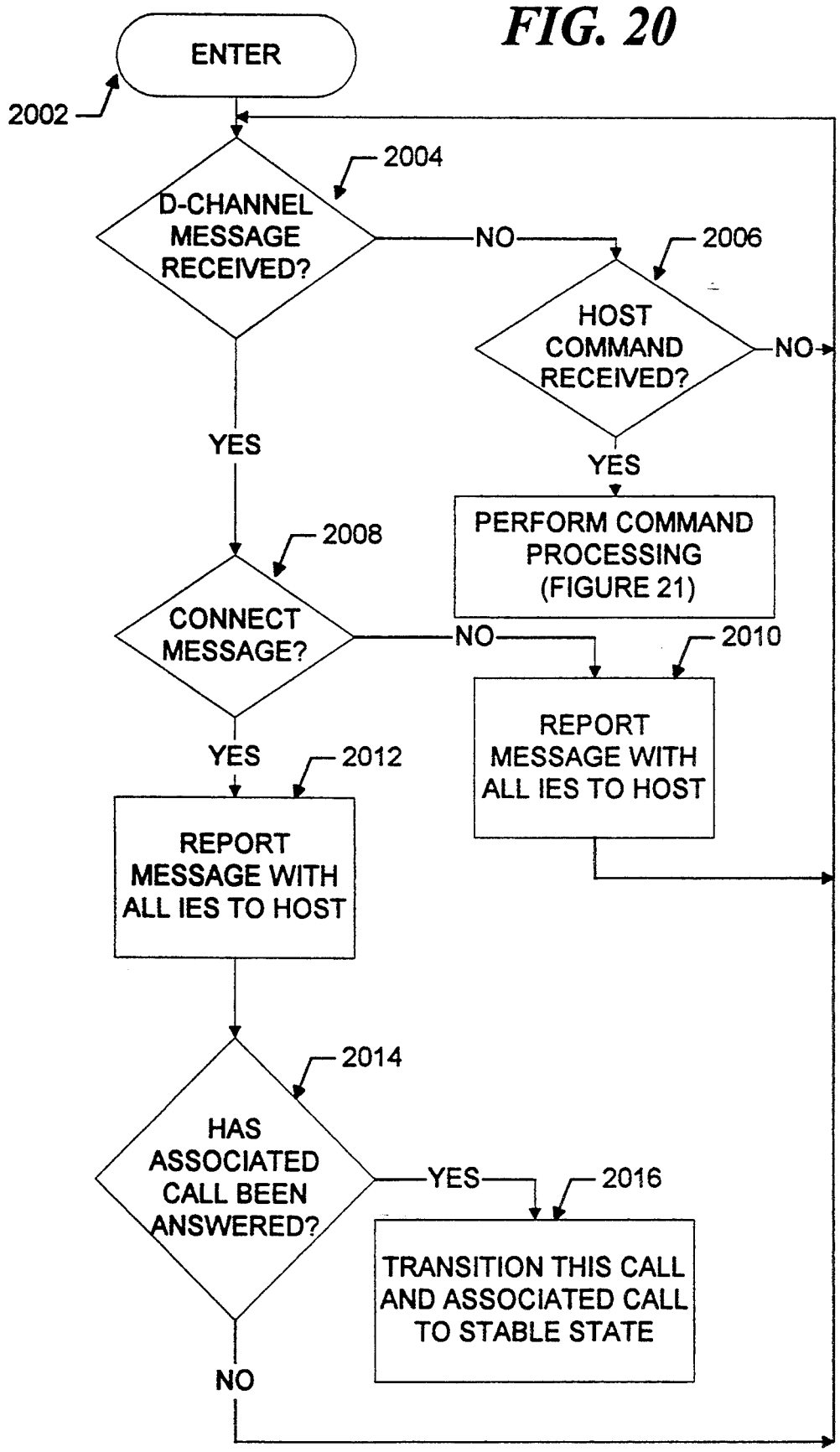
FIG. 20 is a flow chart of a routine that the call processor follows when it is in the setup state or the wait-for-supervision state.

When the call processor enters the set-up state, it begins to execute the routine of FIG. 20, whose entry is represented by Block 2002. In that state, the call processor continually monitors the D-channel and its link with the host for messages and commands concerning the subject call, as blocks 2004 and 2006 indicate. If it receives a data-channel message that is not a CONNECT message, it simply reports that message, complete with all of its information elements, to the host, as Blocks 2008 and 2010 indicate. Set-up-state processing then continues with the monitoring that blocks 2004 and 2006 represent. If the received data-channel message is a CONNECT message, on the other hand, this means that the subject call has been answered. In that case, the message to the host is still generated, as block 2012 indicates, but the call processor additionally checks the associated call to determine whether it has been answered, as Block 2014 indicates. If it has, then the call processor leaves the routine of FIG. 20, as well as the SETUP state that it represents, by placing both calls in the stable state. Block 2016 represents this action. Otherwise, the routine of FIG. 20 continues until a corresponding routine being followed for the associated call detects a CONNECT message for that call and causes both calls to go to their stable states. This routine for the associated call is the wait-for-supervision state, for which the routine is identical to that of FIG. 20.

Figure 12C:
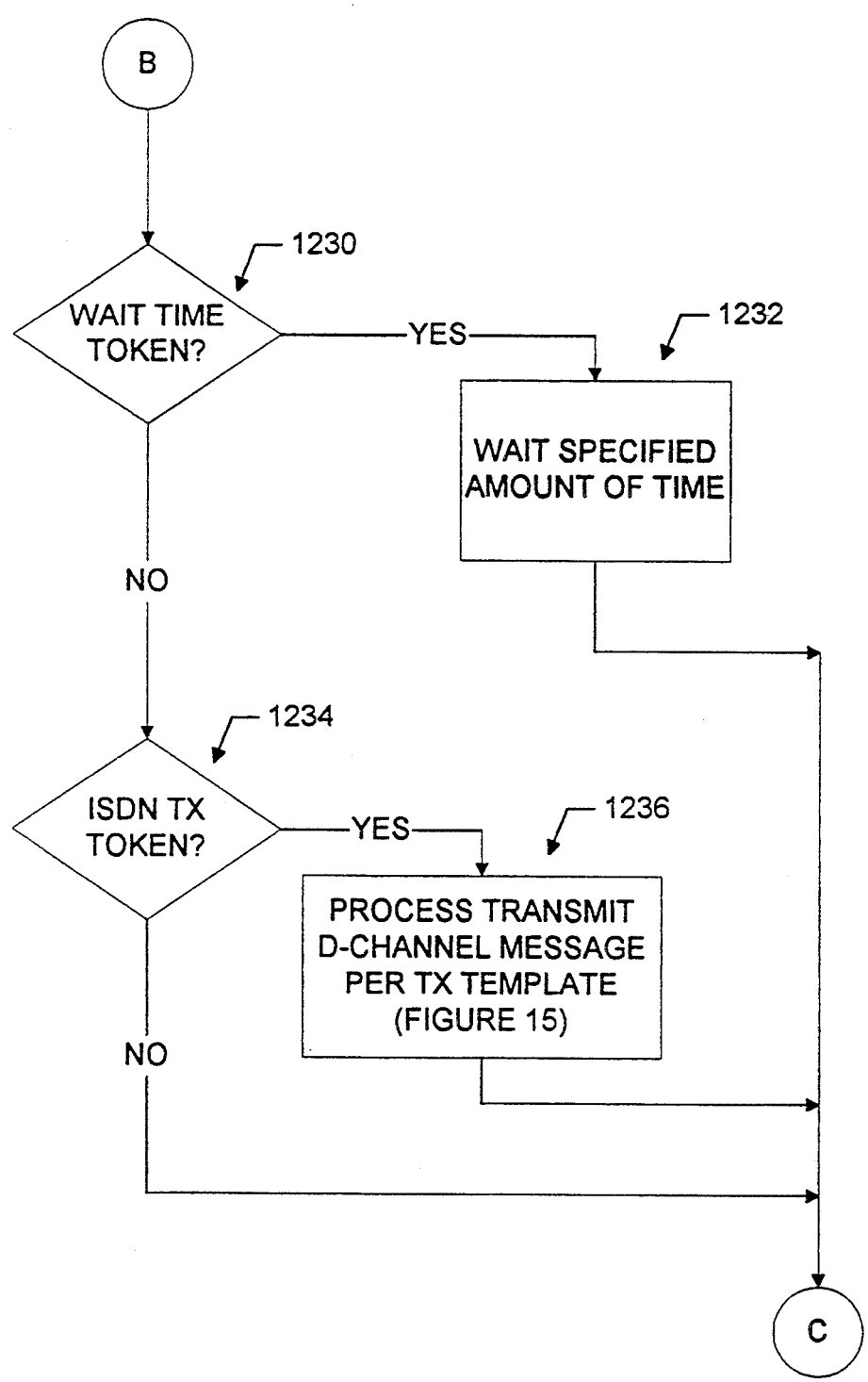
Figure 13C:
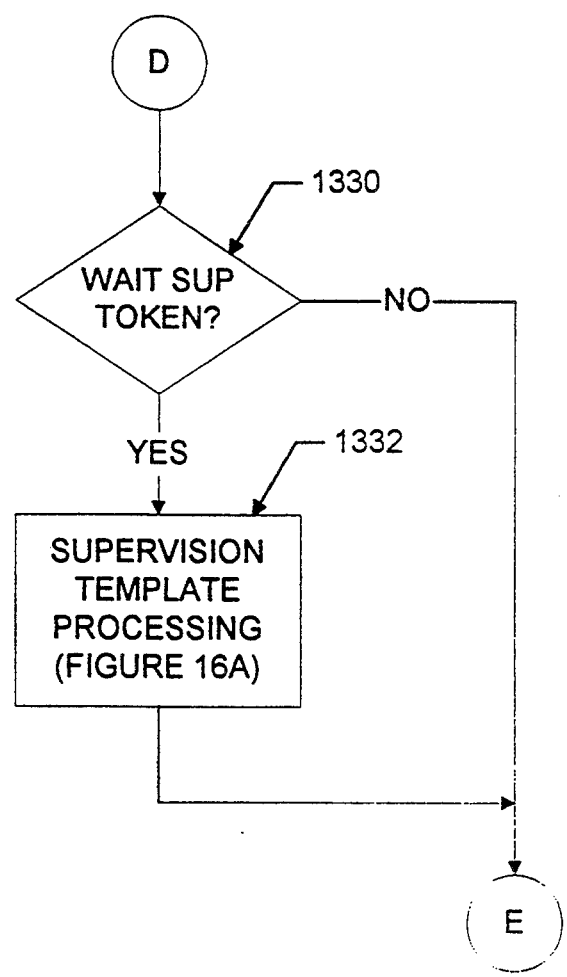
Figure 21:
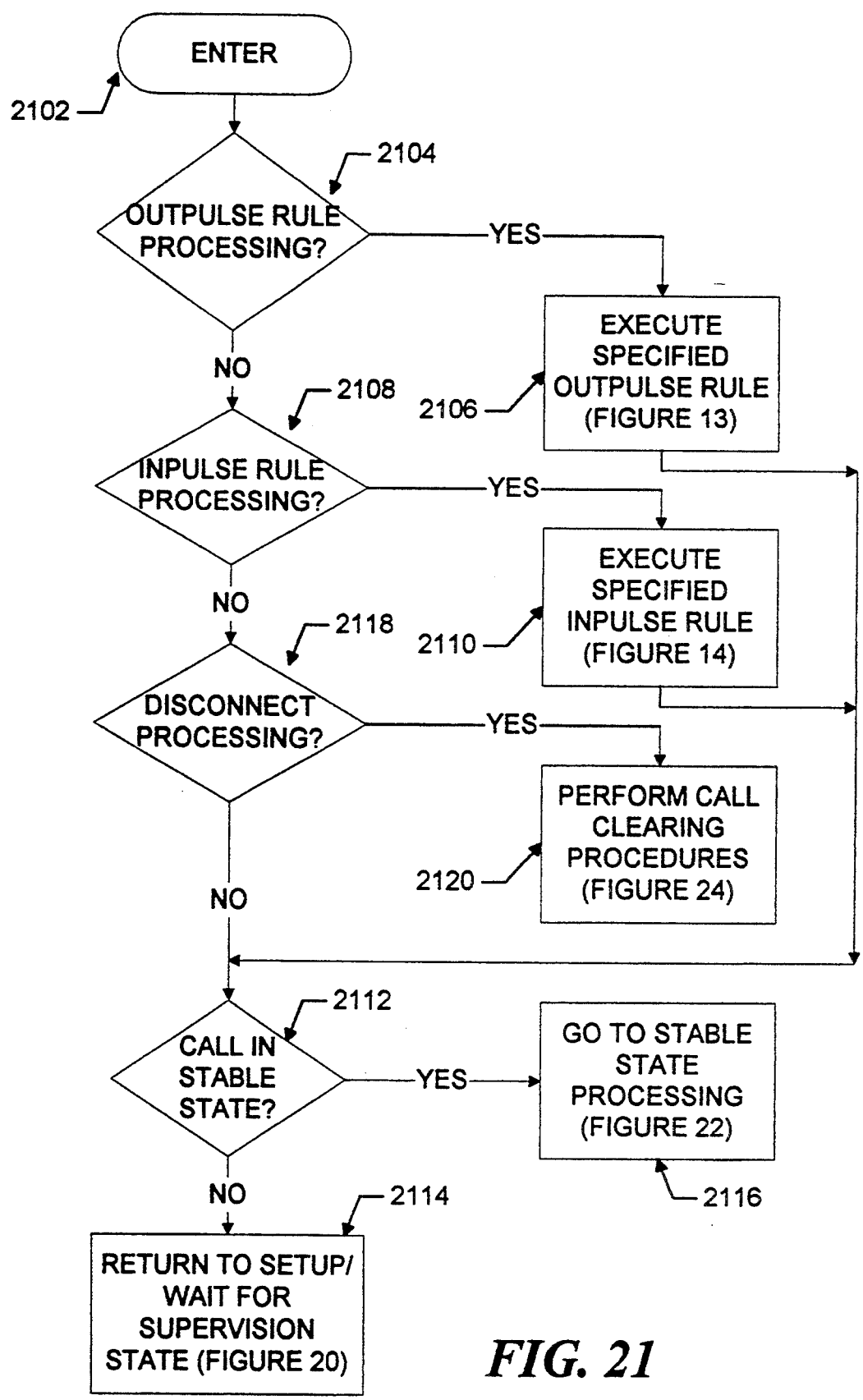
FIG. 21 is a flow chart of a sub routine called in some circumstances by the routines of FIGS. 20 and 22.

If the call processor receives a host command for a call in the set up or wait-for-supervision state—i.e., if the result of test 2006 is affirmative-then the call processor proceeds to the command-processing routine of FIG. 21, whose entry is represented by block 2102. The purpose of the FIG. 21 routine is to determine whether the command from the host invokes an outpulse rule, an inpulse rule, or disconnect processing. If the command requested outpulse- or inpulse-rule processing, the outpulse- or inpulse-rule processing is performed in accordance with the procedures described above in connection with FIGS. 12 and 13, as blocks 2104, 2106, 2108, and 2110 indicate.

If the routine of FIG. 21 had been entered with the call in the setup or wait-for-supervision state, then the call processor returns to the routine of FIG. 20. However, the routine of FIG. 21 can be entered in the stable state, too, so the routine of FIG. 21 includes a step, represented by block 2112, to determine whether to return to the routine of FIG. 20, in accordance with Block 2114, or to return to a stable-state-processing routine, as Block 2116 indicates.

If the received command requested disconnect processing, on the other hand, the call is terminated in accordance with procedures to be described below, as blocks 2118 and 2120 indicate. In these circumstances, the call, of course, does not remain in its setup, wait-for-supervision, or stable state.

Figure 22:
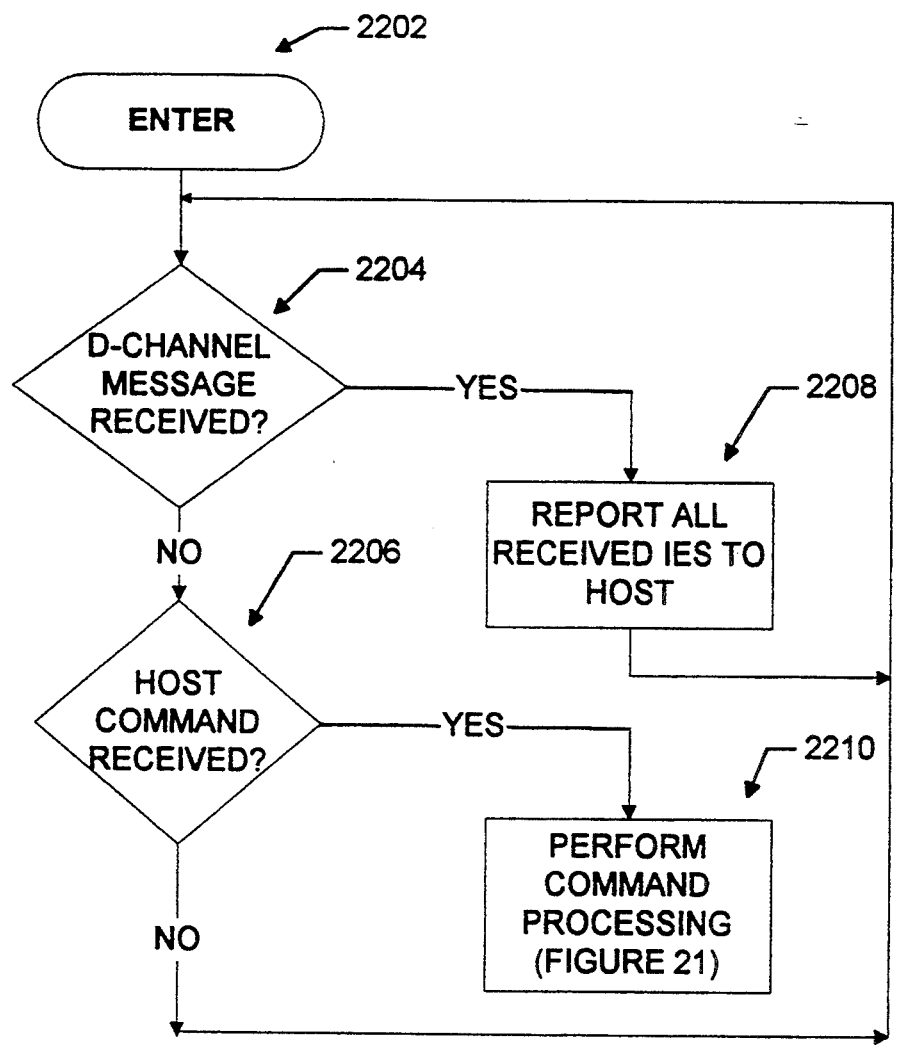
FIG. 22 is a flow chart of a routine that the call processor follows for a call that is in its stable state.

Block 2116 of FIG. 21 represents proceeding to the stable-state routine of FIG. 22, whose entry is represented by block 2202. During the stable state, which is that which prevails during most of an ordinary call, the call processor simply monitors the data channel and the link from the host processor, as blocks 2204 and 2206 indicate. As block 2208 indicates, it reports any data-channel messages, together with all of the included information elements, to the host processor and continues monitoring. If it receives a host command, it performs the command processing of FIG. 21, as block 2210 indicates.

Figure 23:
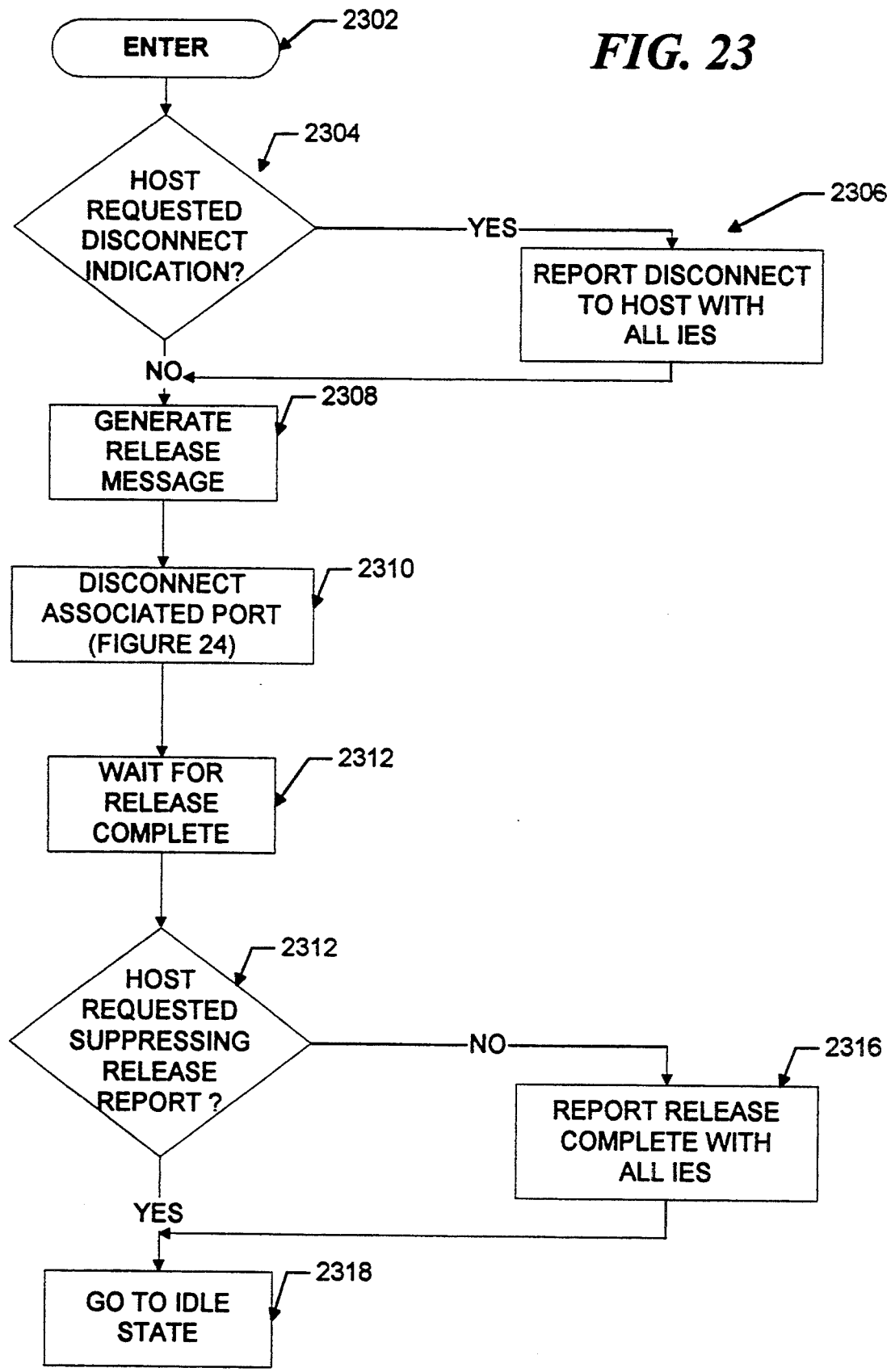
FIG. 23 is a flow chart of a routine that the call processor follows when it receives a DISCONNECT message.
Figure 24:
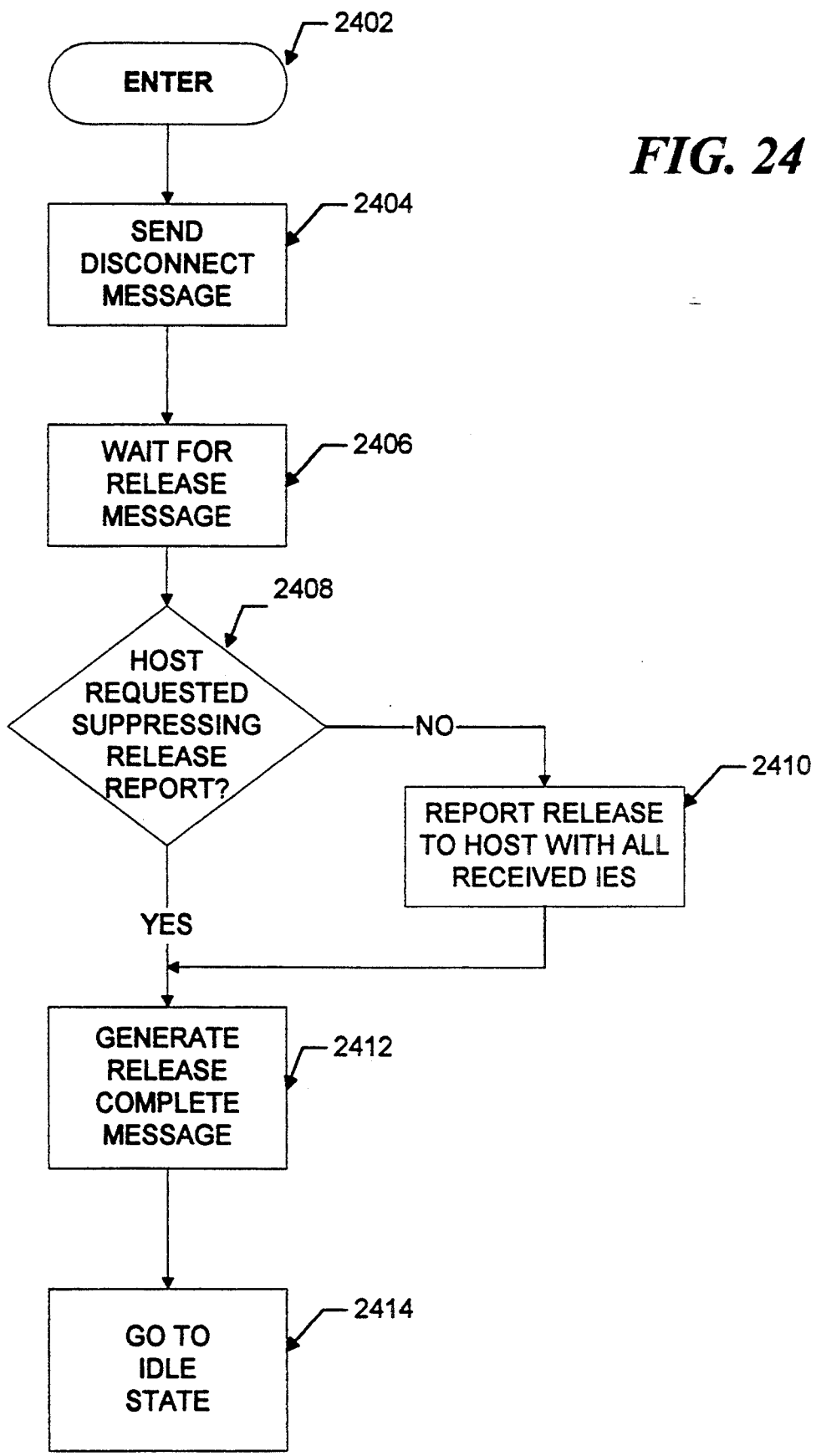
FIG. 24 is a flow chart representing the routine that the call processor follows when it transmits a DISCONNECT message.

FIGS. 23 and 24 depict call-clearing procedures. FIG. 23 represents those that the call processor performs in response to a data-channel DISCONNECT message concerning the subject call. Block 2302 represents entry into this routine in response to such a message. The subject call may have been set up as a result of a host command that specified that it should receive reports of any such DISCONNECT message. If so, the call processor transmits such a report in response to the received DISCONNECT message, as blocks 2304 and 2306 indicate. In any event, the call processor proceeds by transmitting a RELEASE message over the data channel from which the DISCONNECT message was received, as block 2308 indicates. It also causes a disconnect-processing routine to be entered for the associated call, as block 2310 indicates.

For the subject call, it awaits a RELEASE COMPLETE message, as block 2312 indicates. When it receives that message, it reports it to the host processor, as blocks 2314 and 2316 indicate, unless the host has previously requested that such reports be suppressed. In either case, the call is then put into the idle state, i.e., the bearer channel that supported it is now free to be used for another call, as block 2318 indicates.

FIG. 24 also depicts clearing a call, but the call processor enters the routine of FIG. 24 in response either to a host command or to intervention by the routine for the associated call in accordance with step 2310 of FIG. 23. In either case, the call processor sends a DISCONNECT message over the data channel and waits for the resultant RELEASE-message response, as blocks 2404 and 2406 indicate. When the RELEASE message arrives, the call processor sends a report of this fact to the host unless the host has previously requested suppression of such reports, as blocks 2408 and 2410 indicate. In either case, the call processor then transmits the RELEASE COMPLETE message over the data channel, and the bearer channel is now idle, as blocks 2412 and 2414 indicate.

Although the invention has been described above in connection with a specific embodiment, it is clear that its broader principles can be practiced in an embodiment that employs a different selection of commands and considerably different formats. What is important is that the operator or other user be able to specify the call processor's detailed responses in advance so that the host is not required to specify, in real time, detailed treatment of data-channel messages in order to obtain call-processor flexibility. By employing this principle, a call-processing apparatus for ISDN calls can provide the flexibility currently available for analog-call-processing equipment without the need for extensive low-level control by the host.

The flexibility that results from the present invention makes it possible for a call processor of a single design to be used in a wide range of application in many different environments. If a user has invested considerable effort in programming his host computer for processing conventional calls, for example, the behavior-specification abilities of the present invention are particularly valuable because they enable him to tailor the call processor's reports so as to have it effectively "translate" from ISDN terms to the terms of the original programming.

Additionally, the user can be readily assured that a call processor will be compatible with the local operating company's ISDN equipment because the variations among such equipment can readily be accommodated by appropriate rule and template provisions. The user can adjust the call processor in this way not only to the minor differences among various equipment that implements the North American standard but also to the more-significant differences between that equipment and, say, equipment designed to the CCITT standard. The invention thus constitutes a significant advance in the art.

What is claimed is:

1. An ISDN call-processing system comprising:
   A) an input device for generating behavior signals that represent inpulse rules that specify behavior to be followed in response to receipt of ISDN data-channel messages, wherein some of these rules specify information elements; and
   B) a switching system, including:
      i) an input port coupled to the input device for reception of the behavior signals therefrom;
      ii) at least one network port adapted for connection to a respective network line for reception therefrom of ISDN data-channel messages that reference respective calls; and
      iii) a host port adapted for coupling to a host computer for reception therefrom of host input signals that associate inpulse rules with respective calls and for transmitting to the host information requested by the information elements specified in the inpulse rules,
   the switching system storing the inpulse rules represented by the behavior signals and responding to reception of ISDN data-channel messages from the network line in accordance with the thus-stored inpulse rules.

2. An ISDN call-processing system as defined in claim 1 wherein:
   A) the behavior signals represent the inpulse rules as series of inpulse-rule tokens that designate respective actions that the switching system can take in response to ISDN data-channel messages;
   B) the switching system interprets certain of the behavior signals as defining receive-message templates associated with respective ISDN data-channel-message types, these templates including one or more tokens that designate respective actions that the switching system can take, and the switching system stores the templates thus defined;
   C) the switching system interprets certain inpulse-rule tokens as specifying respective ones of the templates thus stored; and
   D) the switching system responds to an ISDN data-channel message that references a call with which host input signals have associated one or more inpulse rules by taking the actions specified by the templates and tokens associated with the rule that is applicable to the received message.

3. An ISDN call-processing system as defined in claim 2 wherein:
   A) the host port includes means for transmitting reports to the host computer;
   B) the switching system interprets certain tokens as specifying which types of information among the information in designated types of ISDN data-channel messages are to be included in the reports and which are to be excluded; and
   C) the host port transmits to the host computer reports that include and exclude information from received data-channel messages in accordance with the information-specifying tokens.

4. An ISDN call-processing system as defined in claim 2 wherein the switching system:
   A) interprets certain information elements in tokens associated with inpulse rules as designating certain received data-channel information for storage and later use;
   B) responds to the reception of ISDN data-channel messages that reference calls associated with such rules by storing the information thus designated; and
   C) transmits data-channel messages that include some information thus stored.

5. An ISDN call-processing system as defined in claim 1 wherein:
   A) the input device also generates behavior signals that represent outpulse rules that specify ISDN data-channel messages to be sent;
   B) the host port is further adapted to receive host input signals that specify outpulse rules to be executed for respective calls;
   C) the switching system stores the outpulse rules represented by the behavior signals and responds to reception of host input signals at the host port by sending ISDN data-channel messages in accordance with the thus-stored outpulse rules associated with or specified by the input signals.

6. An ISDN call-processing system as defined in claim 5 wherein:
   A) the behavior signals represent the outpulse rules as series of tokens that designate respective actions that the switching system can take;
   B) the switching system interprets certain of the behavior signals as defining transmit-message templates associated with respective ISDN data-channel-message types and including tokens that designate respective actions that the switching system can take;

C) the switching system interprets certain outpulse-rule tokens as specifying respective transmit-message templates; and D) in response to host input signals that specify outpulse rules that include tokens that specify transmit-message templates, the switching system takes the actions that the thus-specified tokens designate.

7. An ISDN call-processing system as defined in claim 6 wherein:

A) the switching system interprets certain of the behavior signals as defining supervision templates that include tokens designating respective actions that the switching system can take and associate them with respective data-channel message types in response to receipt of which the token-designated actions are to be taken;

B) the switching system interprets certain tokens associated with the outpulse rules as specifying respective supervision templates; and C) the switching system responds to reception at the network port of an ISDN data-channel message that references a call with which host input signals have associated an outpulse rule containing a token that specifies a supervision template by taking the actions specified by the supervision template, if the rule is applicable to the received message.

8. An ISDN call-processing system as defined in claim 7 wherein:

A) the host port includes means for transmitting reports to the host computer;

B) the switching system interprets certain of the behavior signals as defining receive-message templates associated with respective ISDN data-channel-message types and including tokens, some of which designate the contents of reports that the port can transmit to the host computer;

C) the switching system interprets certain tokens as specifying respective receive-message templates;

D) the switching system interprets certain other tokens as requiring reports in response to ISDN data-channel messages of the types with which their supervision templates associate them; and E) in response to receipt at the network port of an ISDN data-channel message that references a call for which host signals received at the host port have specified one or more outpulse rules that includes either or both (i) one or more tokens that specify a supervision template that includes a token that specifies a report and (ii) one or more tokens that specify a receive-message template that includes tokens that specify message contents, the host port transmits to the host computer, in accordance with the tokens that are applicable to the received message, a report having contents specified by the tokens.

9. An ISDN call-processing system as defined in claim 8 wherein the switching system:

A) interprets certain tokens as designating received data-channel information for storage and later use;

B) responds to the reception of ISDN data-channel messages that reference calls associated with such rules by storing the information thus designated; and C) transmits data-channel messages that include some information thus stored.

10. An ISDN call-processing system as defined in claim 8 wherein:

A) the host port includes means for transmitting reports to the host computer over the ISDN data channel;

B) the switching system interprets certain tokens as specifying which among the information in designated types of ISDN data-channel messages are to be included in the reports and which are to be excluded; and C) the host port transmits to the host computer over the ISDN data channel reports that include and exclude information from received data-channel messages in accordance with the information-specifying tokens.

11. An ISDN call-processing system as defined in claim 1 wherein:

A) the host port includes means for transmitting reports to the host computer over the ISDN data channel;

B) the switching system interprets certain inpulse rules as specifying which among the information in designated types of ISDN data-channel messages are to be included in the reports and which are to be excluded therefrom; and C) the host port transmits to the host computer over the ISDN data channel reports that include and exclude information from received data-channel messages in accordance with the information-specifying tokens.

12. An ISDN call-processing system as defined in claim 1 wherein the input device is a manual input device that generates the behavior signals in response to manual inputs.

13. An ISDN call-processing system as defined in claim 1 wherein:

A) the behavior signals represent the inpulse rules as series of inpulse-rule tokens that designate respective actions that the switching system can take;

B) the switching system interprets certain of the behavior signals as defining transmit-message templates associated with respective ISDN data-channel-message types and including series of transmit-message-template tokens that designate respective actions that the switching system can take;

C) the switching system interprets certain inpulse-rule tokens as specifying respective transmit-message templates; and D) in response to host input signals that specify inpulse rules that include tokens that specify transmit-message templates, the switching system takes the actions that the thus-specified tokens designate.

14. An ISDN call-processing system comprising:

A) an input device for generating behavior signals that represent outpulse rules that specify ISDN data-channel messages to be sent, certain of the behavior signals specifying information to be sent to a host computer;

B) a switching system, including:
  i) an input port coupled to the input device for reception of the behavior signals therefrom;
  ii) at least one network port adapted for connection to a respective network line for reception therefrom of ISDN data-channel messages that reference respective calls; and
  iii) a host port adapted for coupling to the host computer for reception therefrom of host input signals that specify outpulse rules to be executed for respective calls, the switching system storing the outpulse rules represented by the behavior signals and responding to reception at the host port of host input signals that are applicable to the outpulse rules by sending ISDN data-channel messages to the host in accordance with the applicable thus-stored outpulse rules.

15. An ISDN call-processing system as defined in claim 14 wherein:
   A) the behavior signals represent the outpulse rules as series of outpulse-rule tokens that designate respective actions that the switching system can take;
   B) the switching system interprets certain of the behavior signals as defining transmit-message templates associated with respective ISDN data-channel-message types and including series of transmit-message-template tokens that designate respective actions that the switching system can take;
   C) the switching system interprets certain outpulse-rule tokens as specifying respective transmit-message templates; and
   D) in response to host input signals that specify outpulse rules that include tokens that specify transmit-message templates, the switching system takes the actions that the thus-specified tokens designate.

16. An ISDN call-processing system as defined in claim 14 wherein the input device is a manual input device that generates the behavior signals in response to manual inputs.

17. A call processing system for processing calls over a digital system, the call processing system including:
   A) an input device for generating behavior signals that represent rules that specify data-channel messages to be sent, the rules specifying the types of information to be included in the specified messages;
   B) a switching system, including:
      i) an input port coupled to the input device for reception of the behavior signals therefrom;
      ii) at least one network port adapted for connection to a respective network line for reception therefrom of data-channel messages that reference respective calls; and
      iii) a host port adapted for coupling to a host computer for reception therefrom of host input signals that specify rules to be executed for respective calls,
   for storing the rules represented by the behavior signals and responding to reception of messages over the data-channel by performing operations in accordance with the applicable rules and sending data-channel messages to the host in accordance with the rules, the switching system including in the messages information of the types specified therein.

18. The call processing system of claim 17, wherein the input device includes update means for modifying the behavior signals to update the rules and specify different types of information to be included in the specified messages.

19. The call processing system of claim 18, wherein the switching system performs various operations specified in a rule and sends to the host information relating to the performance of the operations.

* * * * *